Oct. 27, 1936.  C. J. SCHROEDER  2,058,728
BARREL WASHING APPARATUS
Filed Feb. 1, 1929  22 Sheets—Sheet 2
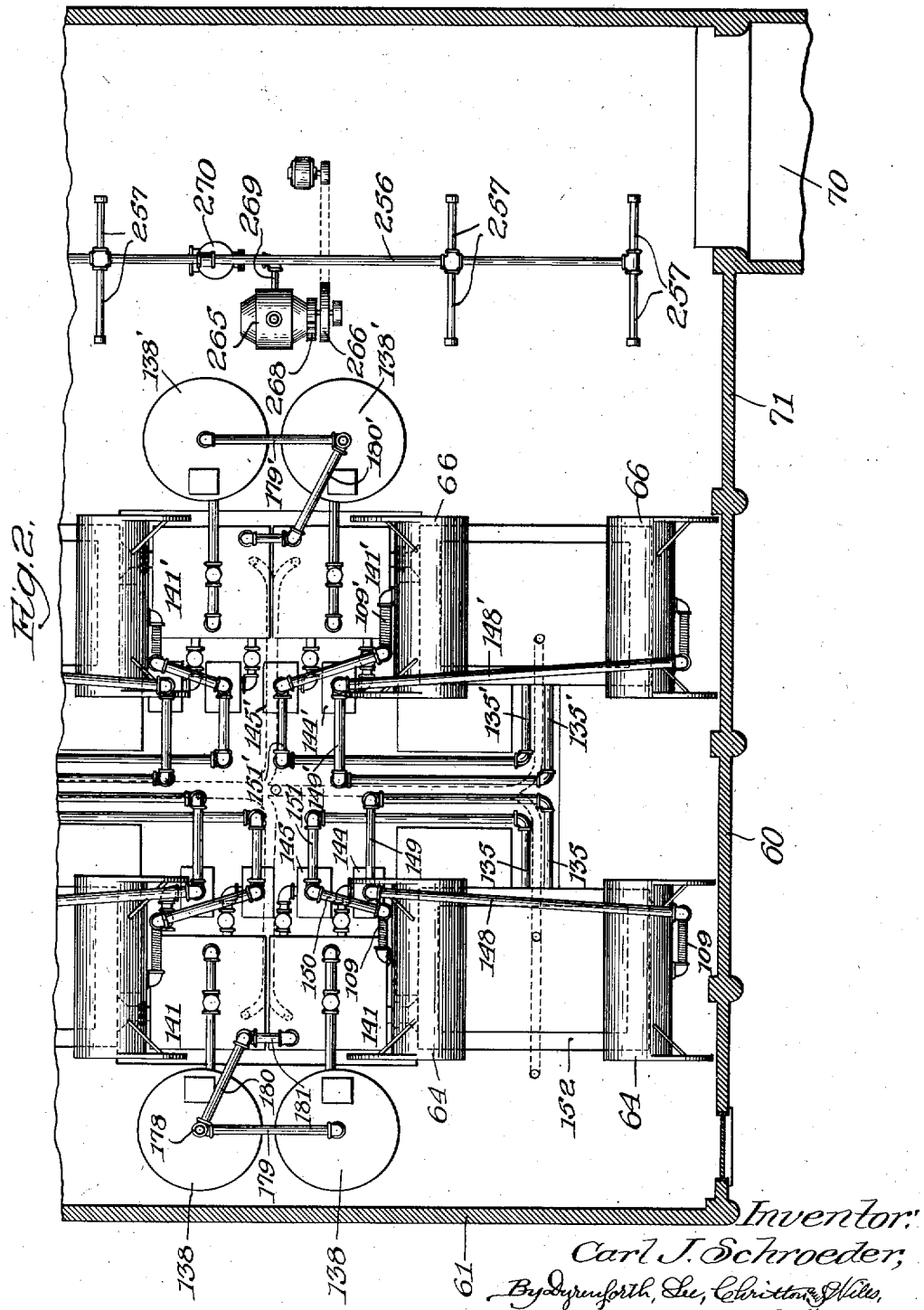
Inventor:
Carl J. Schroeder,
By Dyrenforth, Lee, Chritton & Wiles,
Attys.

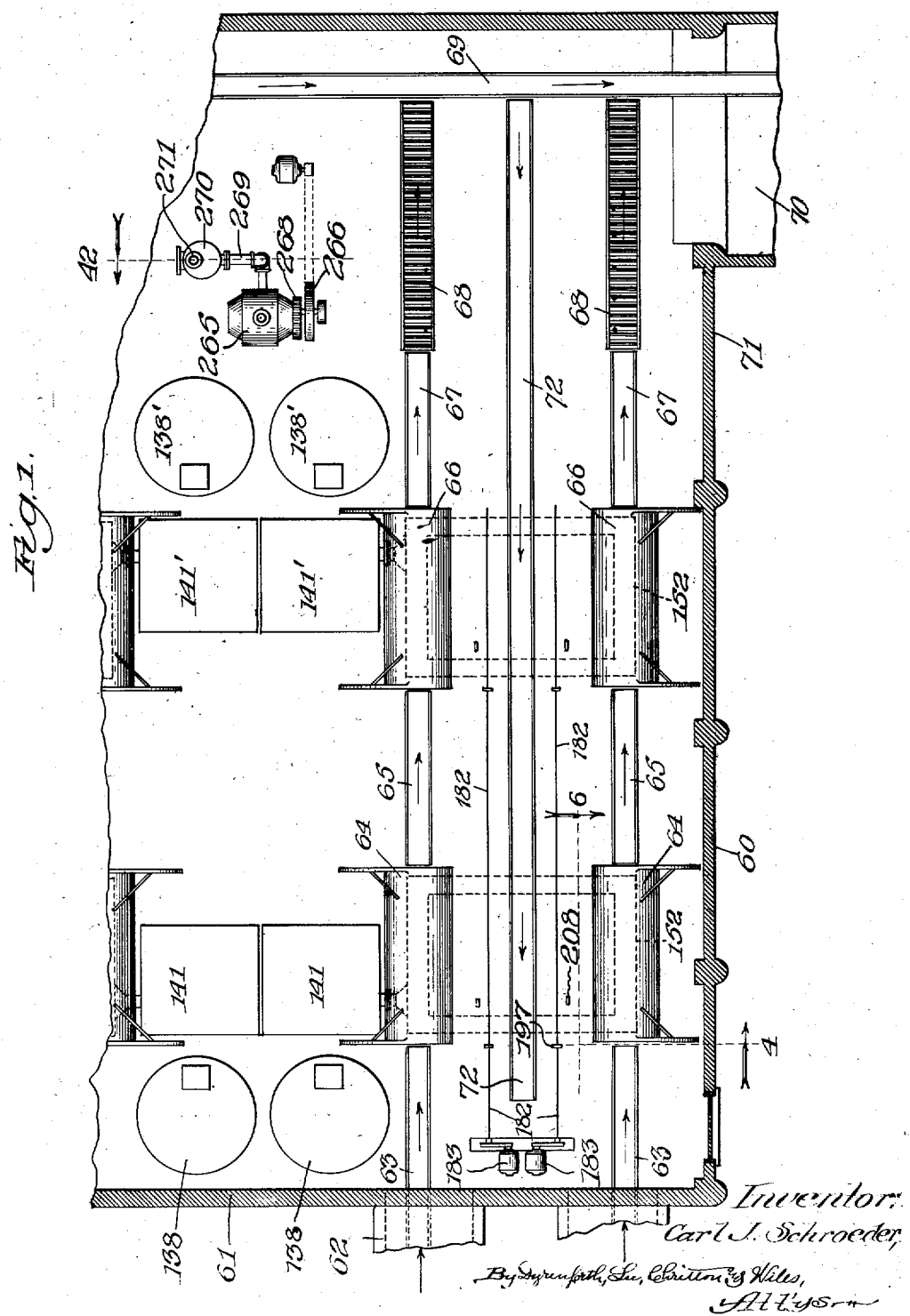

Oct. 27, 1936.  C. J. SCHROEDER  2,058,728
BARREL WASHING APPARATUS
Filed Feb. 1, 1929  22 Sheets-Sheet 3
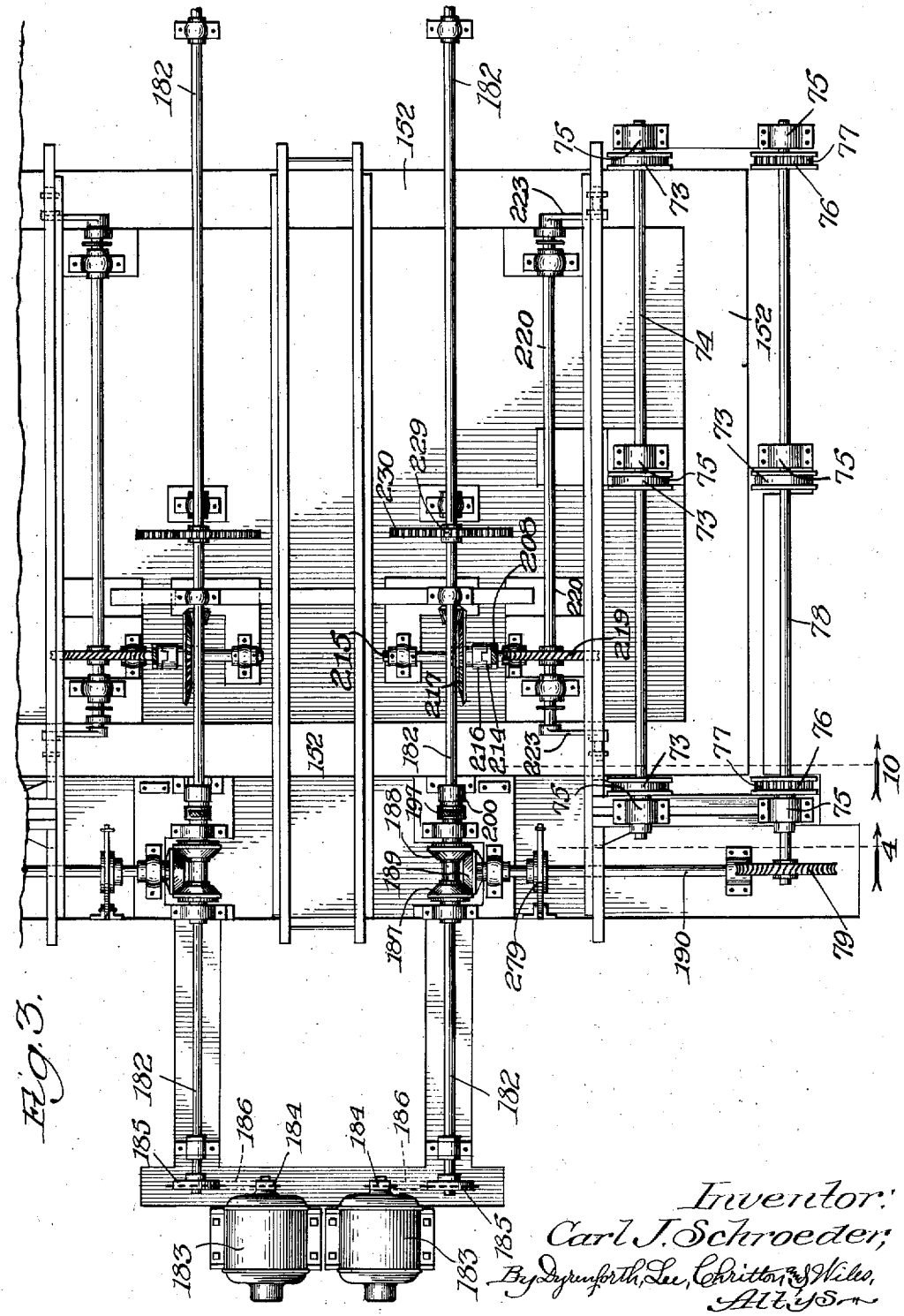

Oct. 27, 1936.  C. J. SCHROEDER  2,058,728
BARREL WASHING APPARATUS
Filed Feb. 1, 1929  22 Sheets—Sheet 4
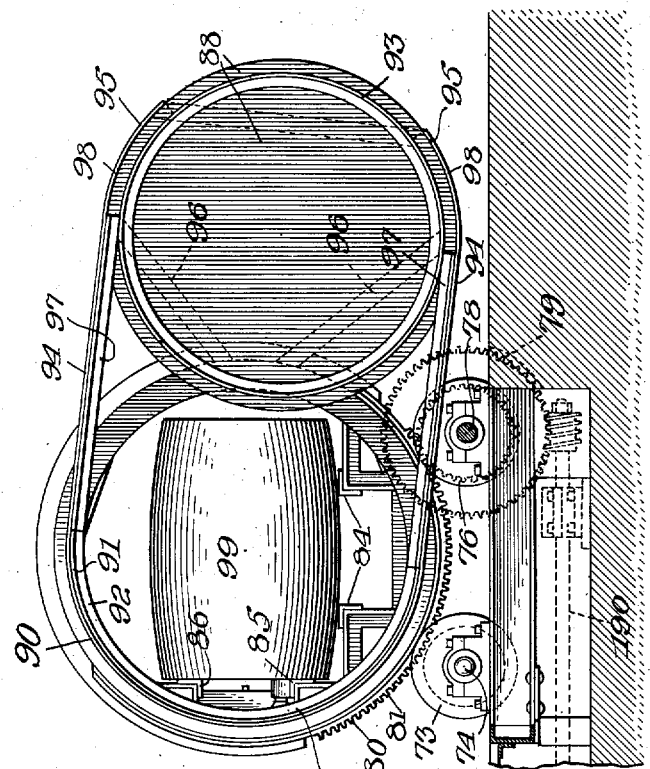
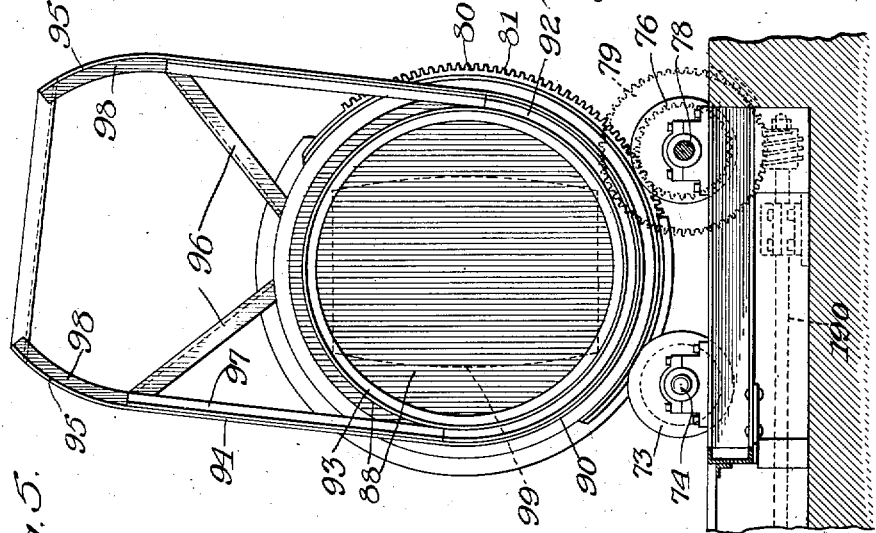
Inventor:
Carl J. Schroeder,
By Dyrenforth, Lee, Chritton & Wiles,
Att'ys Oct. 27, 1936.　　　C. J. SCHROEDER　　　2,058,728
BARREL WASHING APPARATUS
Filed Feb. 1, 1929　　　22 Sheets-Sheet 5
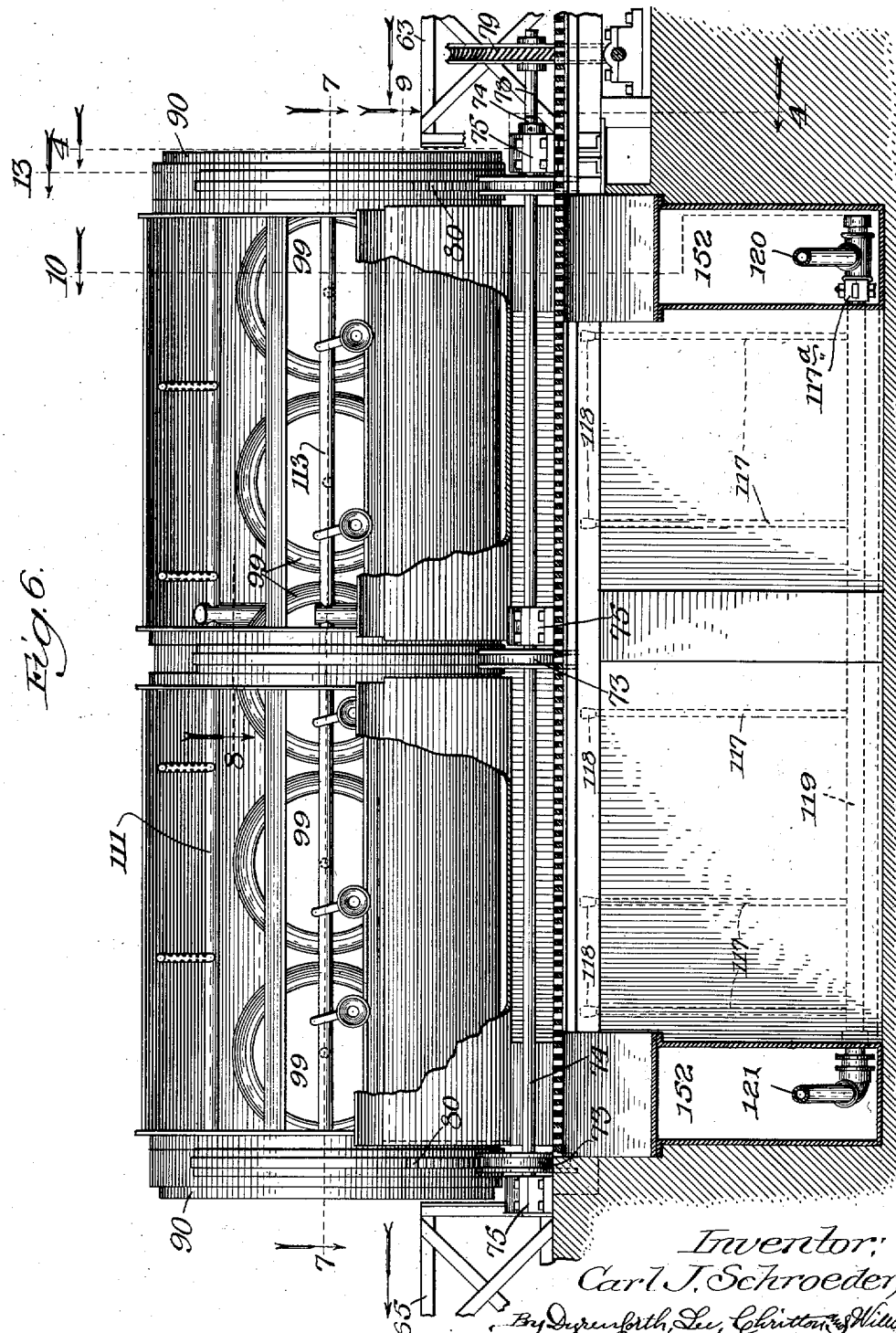
Inventor:
Carl J. Schroeder,
By Dyrenforth, Lee, Chritton & Wiles
Attys

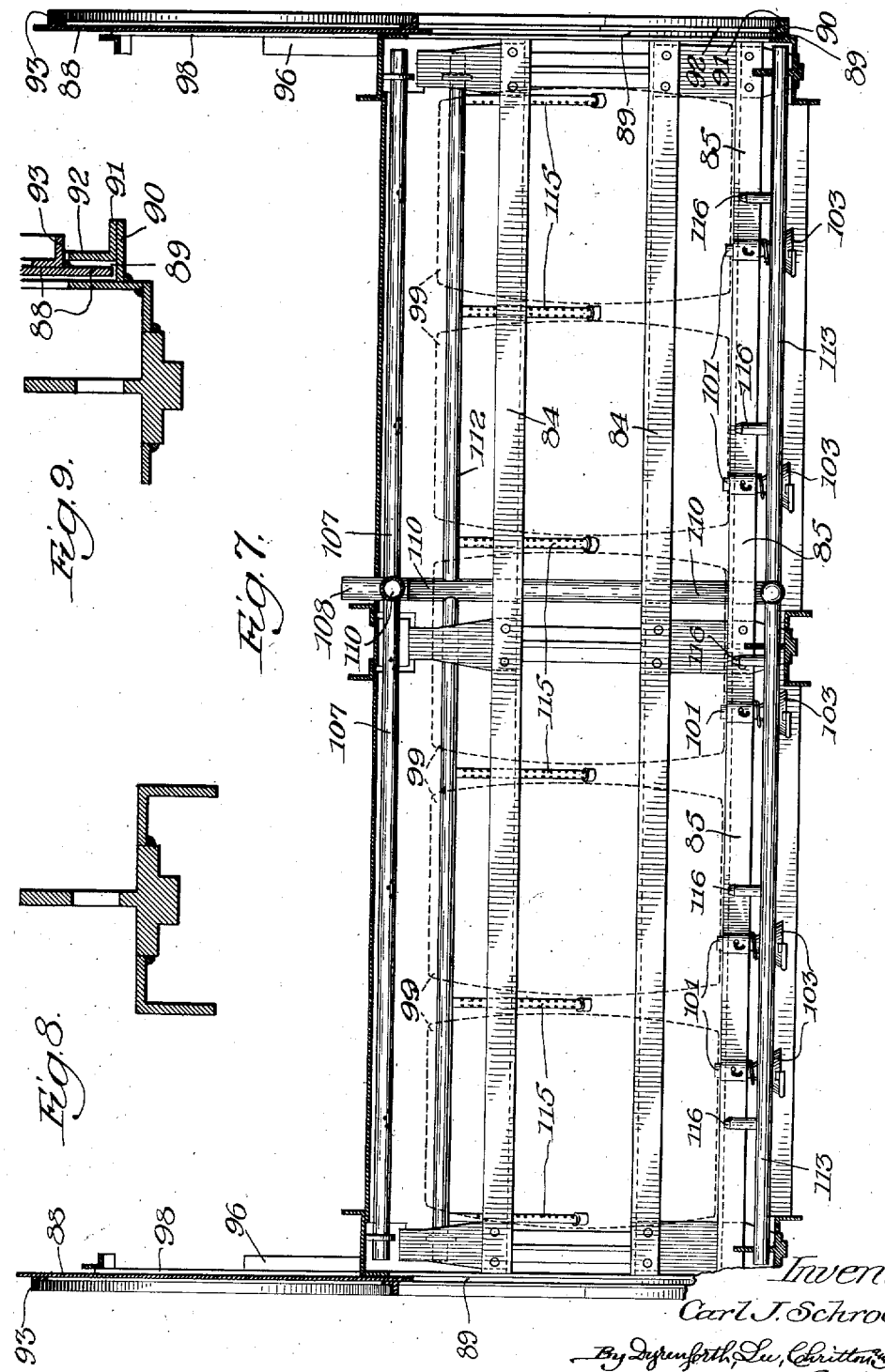

Oct. 27, 1936.    C. J. SCHROEDER    2,058,728
BARREL WASHING APPARATUS
Filed Feb. 1, 1929    22 Sheets-Sheet 7
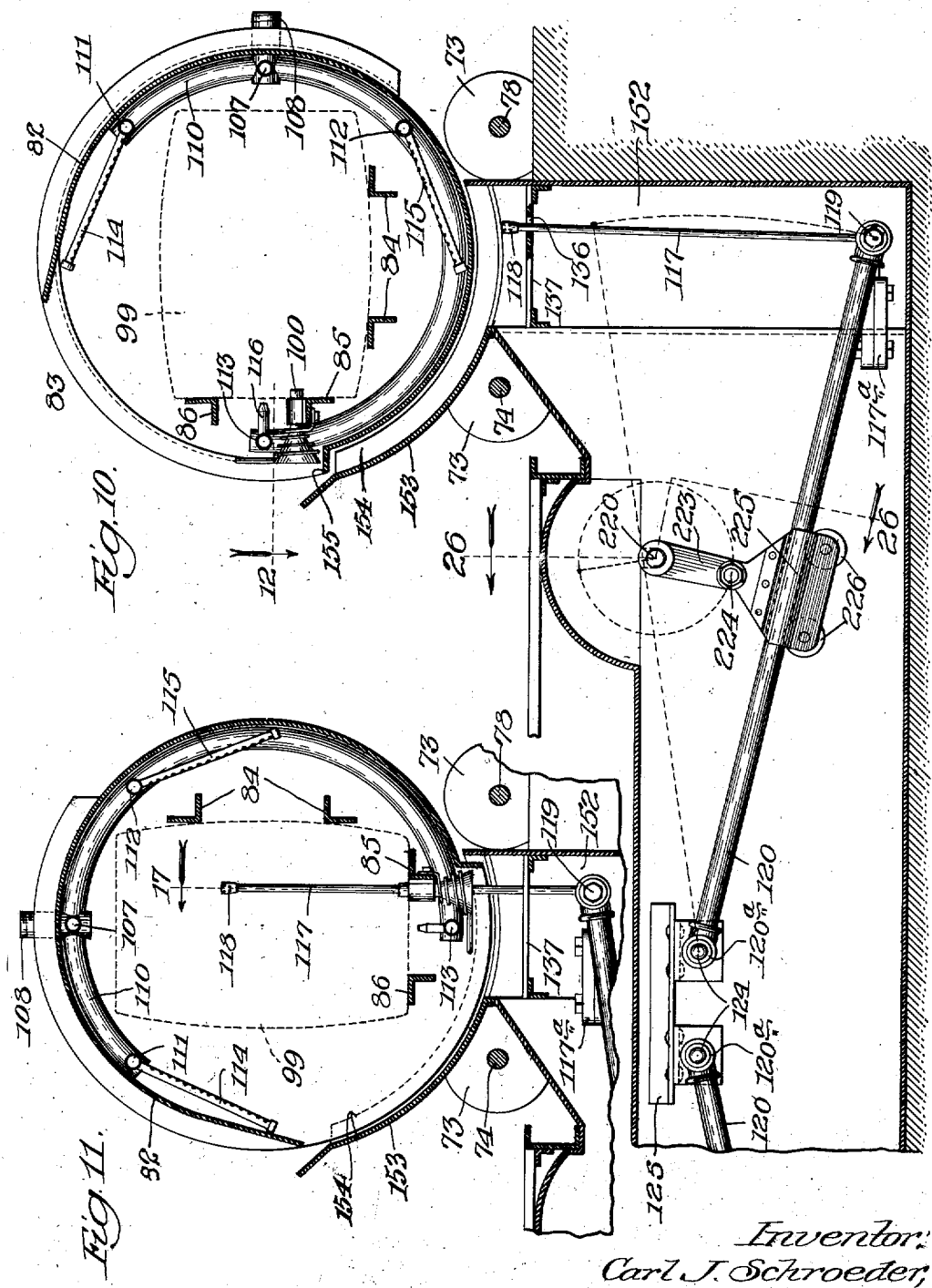
Inventor:
Carl J. Schroeder,

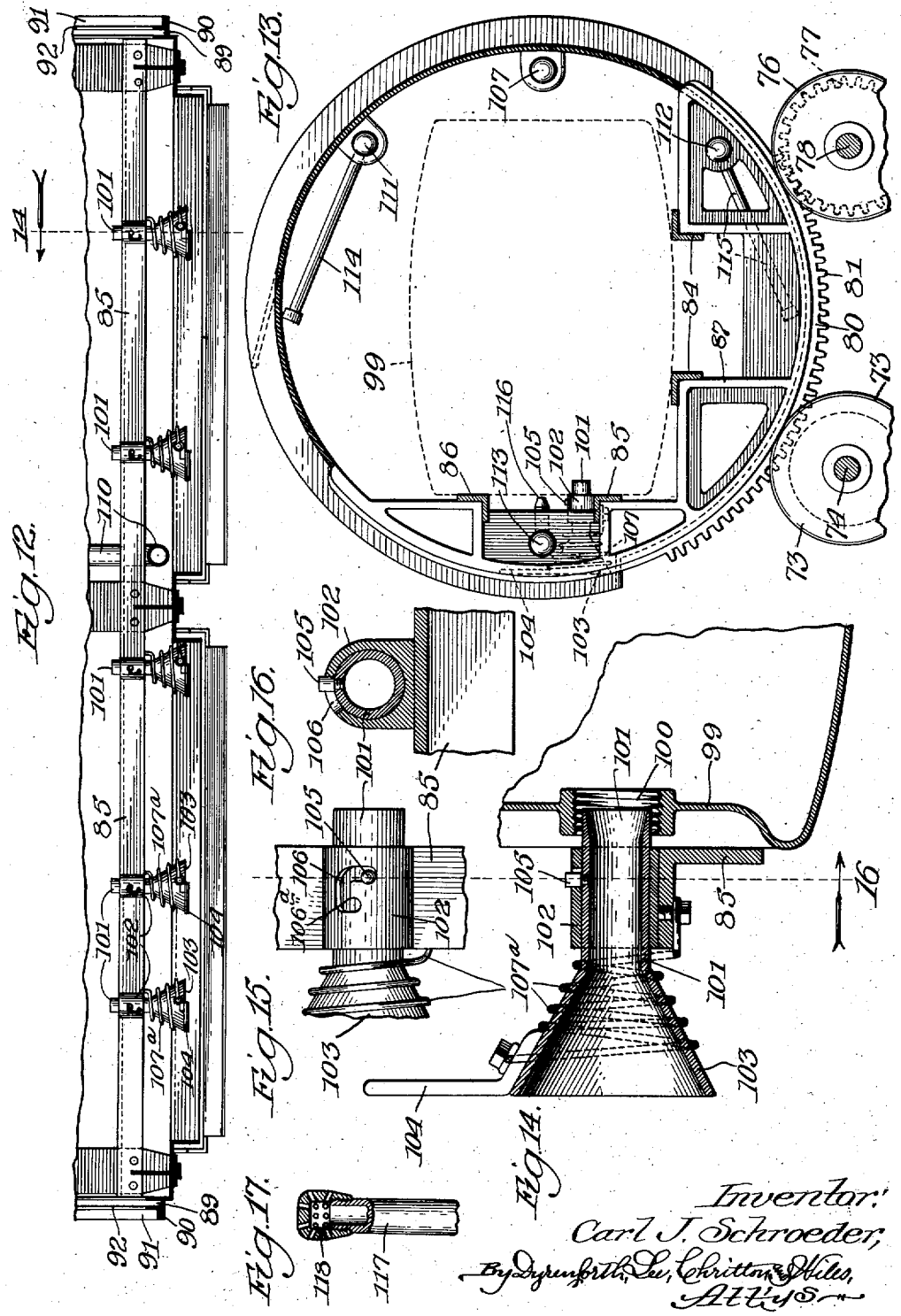

Oct. 27, 1936.  C. J. SCHROEDER  2,058,728
BARREL WASHING APPARATUS
Filed Feb. 1, 1929  22 Sheets-Sheet 9
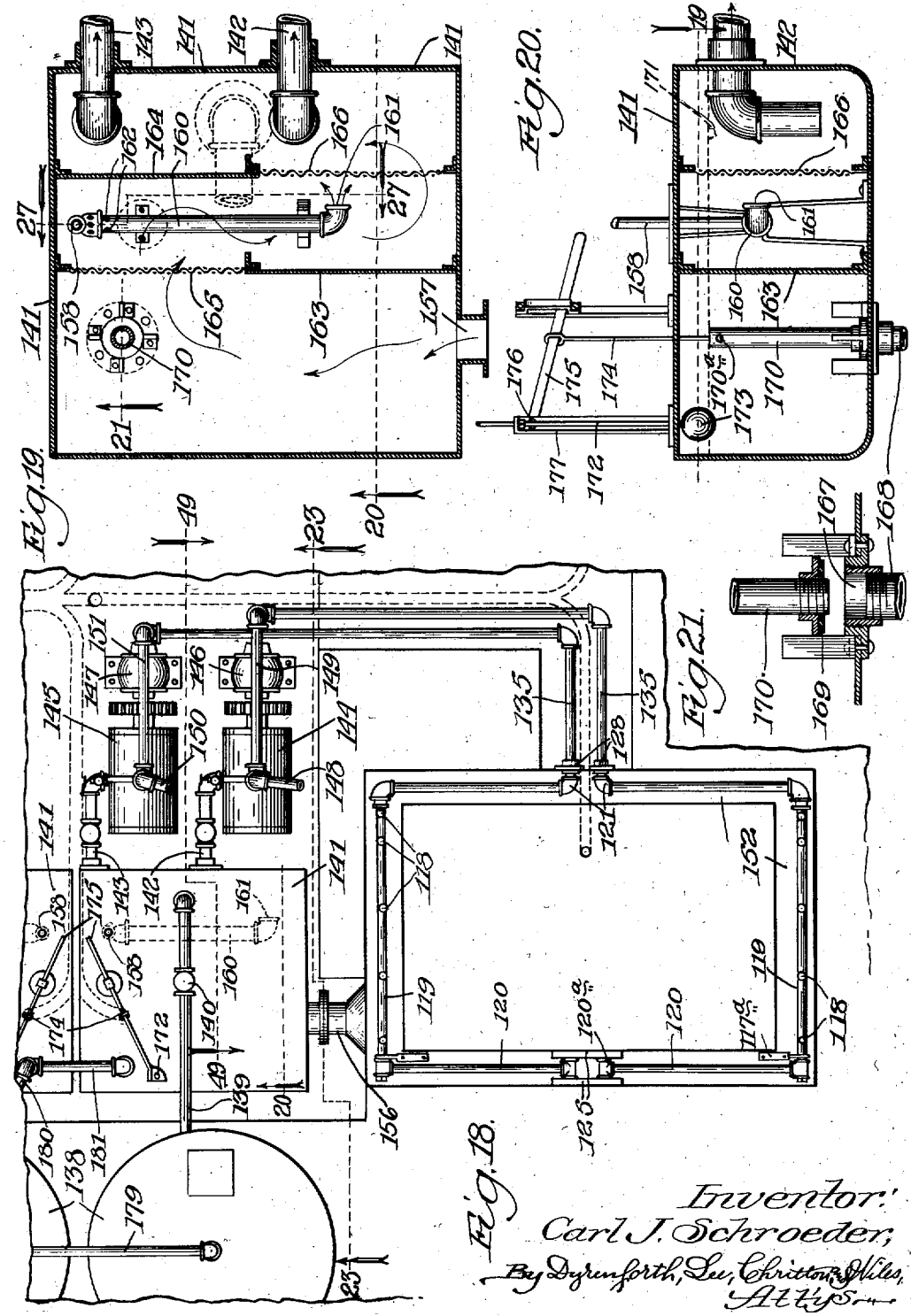

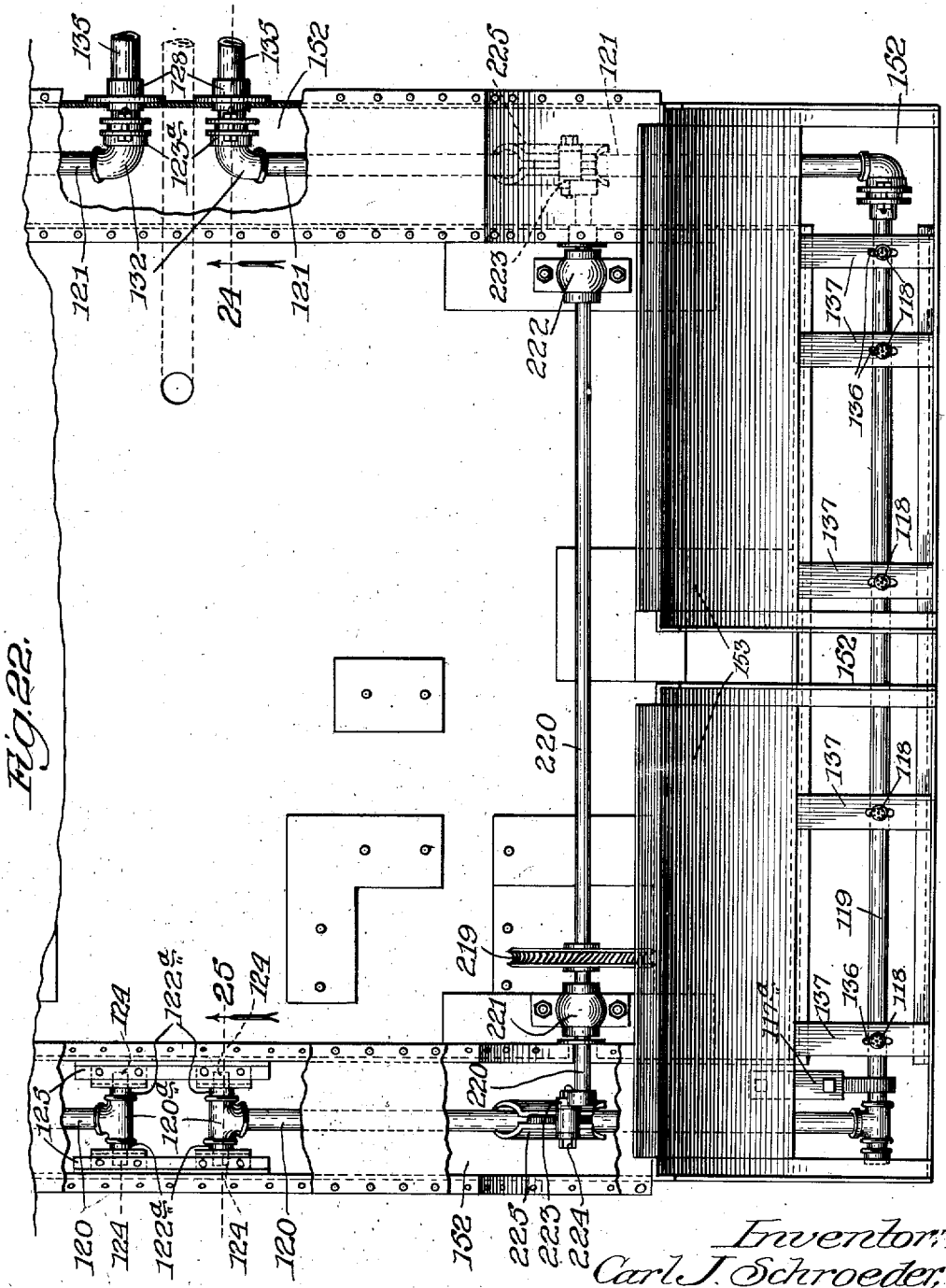

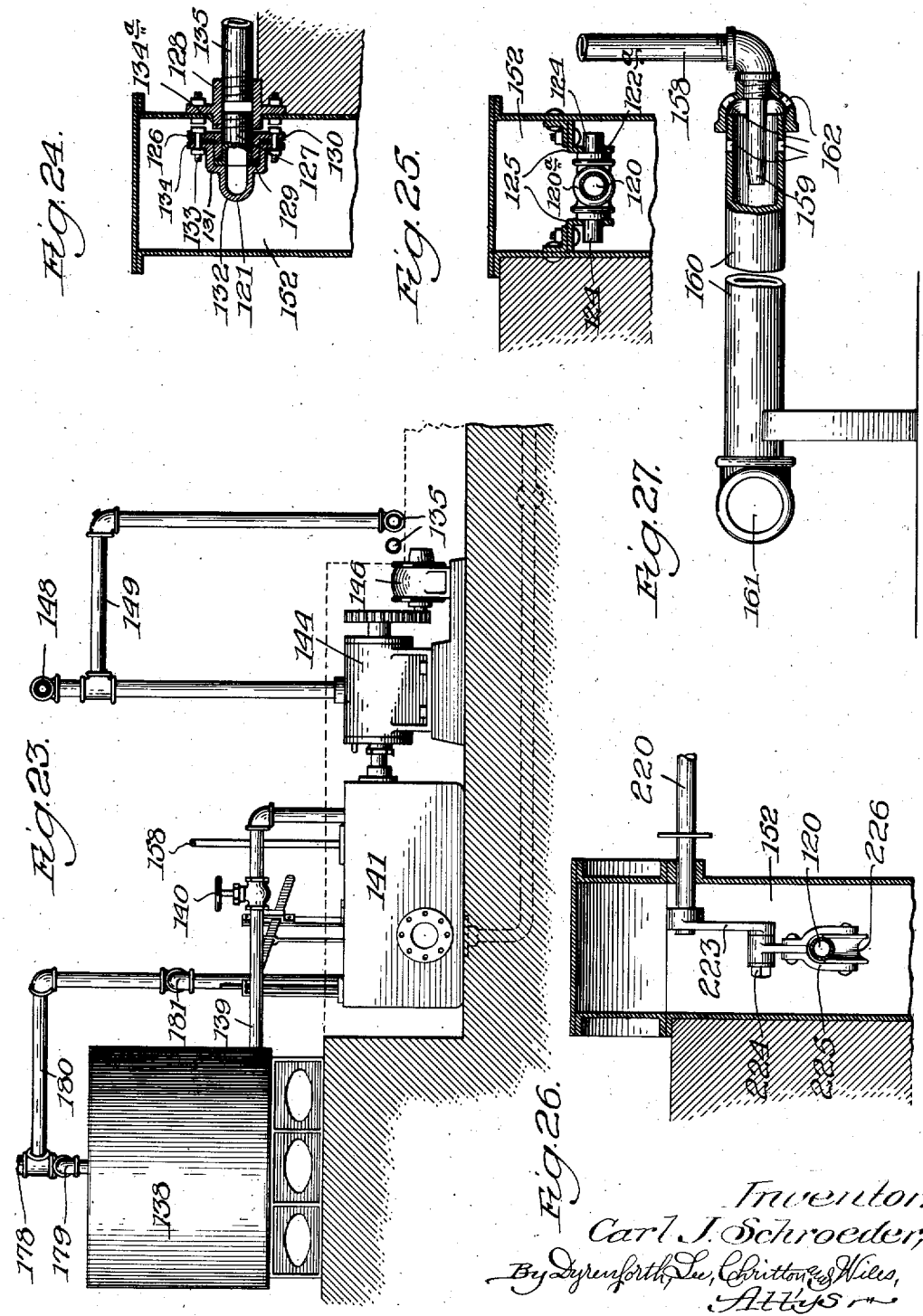

Oct. 27, 1936.  C. J. SCHROEDER  2,058,728
BARREL WASHING APPARATUS
Filed Feb. 1, 1929   22 Sheets-Sheet 12

Inventor:
Carl J. Schroeder,
By Dyrenforth, Lee, Chritton & Wiles,
Attys.

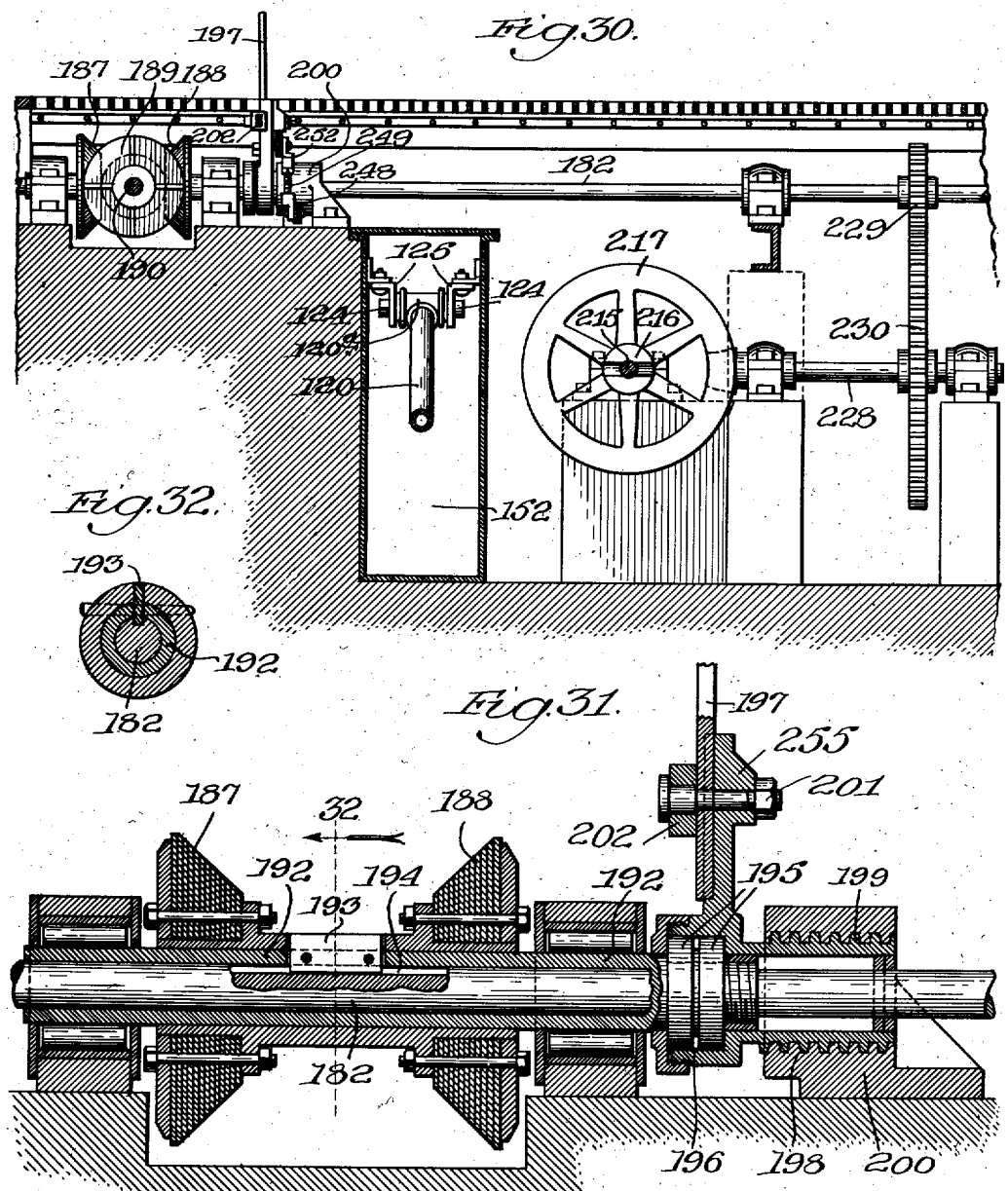

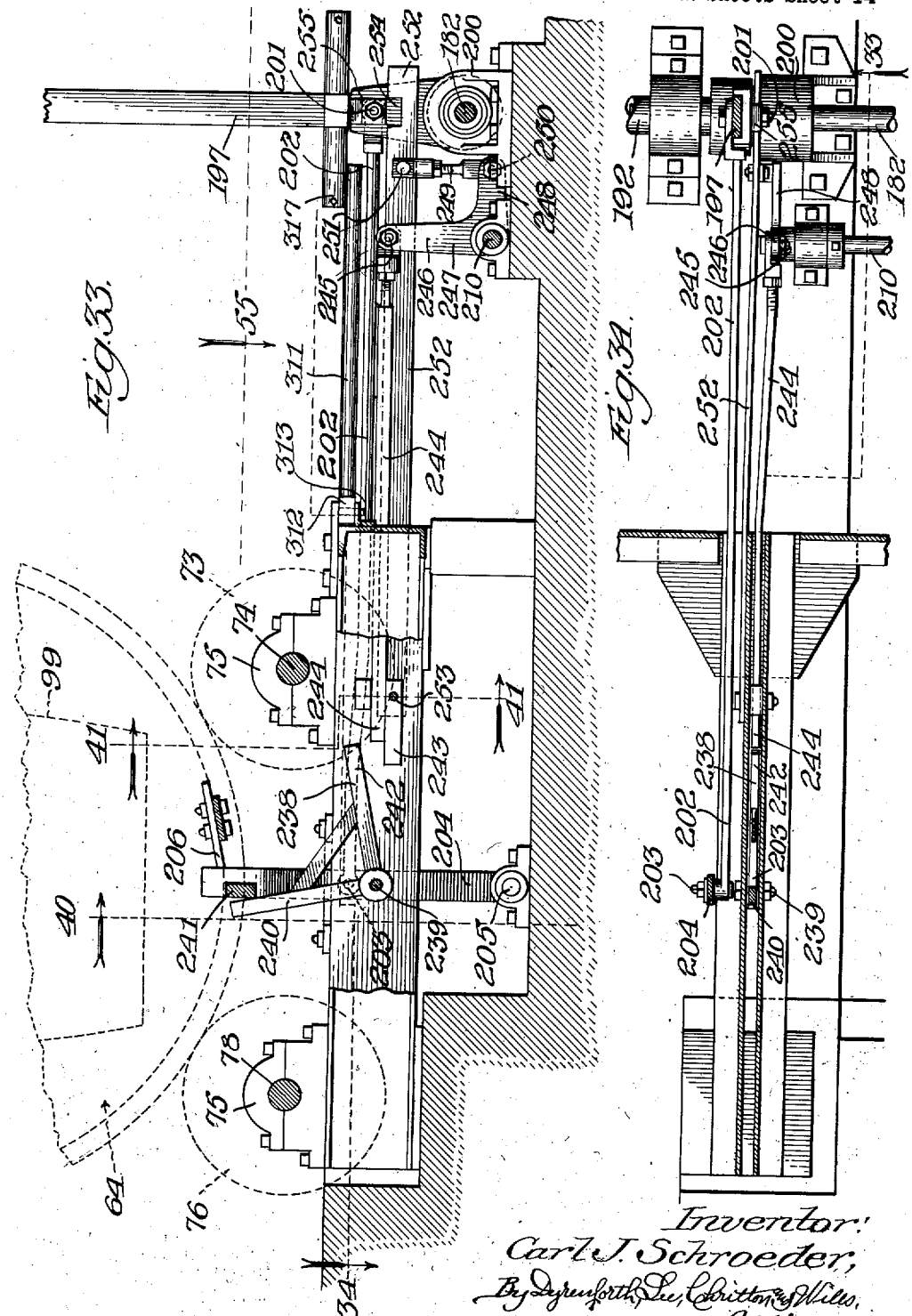

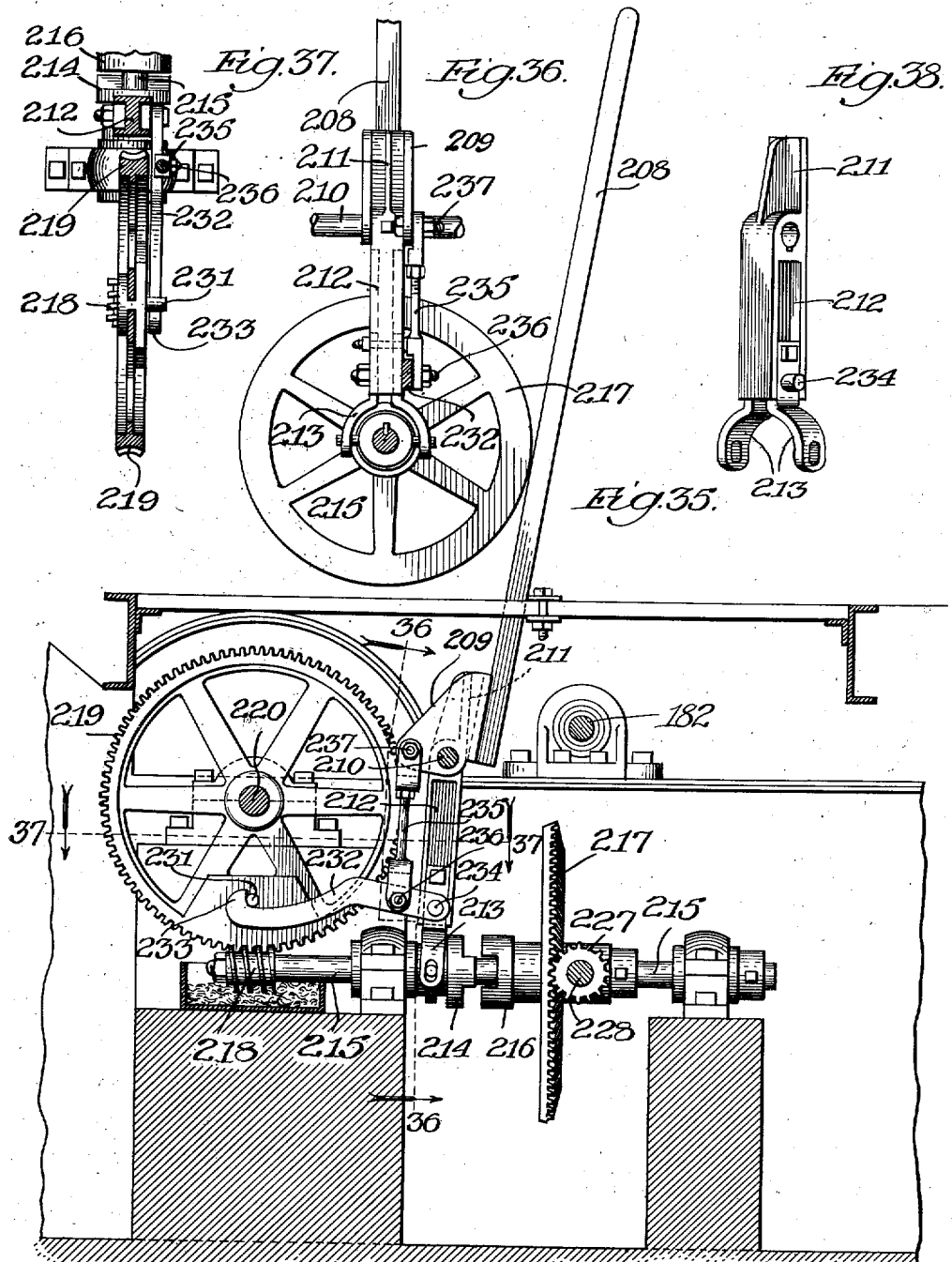

Oct. 27, 1936.  C. J. SCHROEDER  2,058,728
BARREL WASHING APPARATUS
Filed Feb. 1, 1929  22 Sheets-Sheet 16
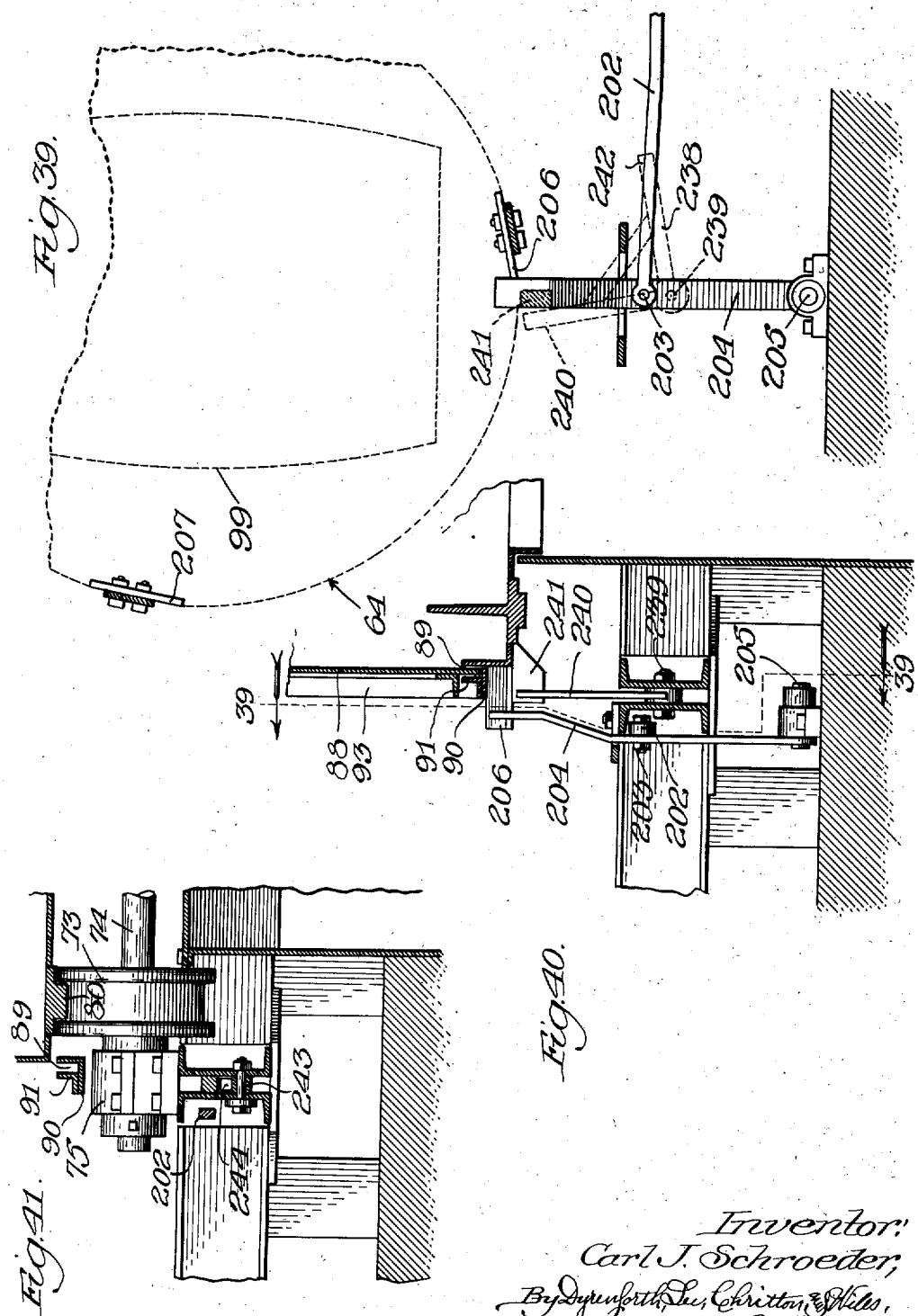
Inventor:
Carl J. Schroeder,
By Dyrenforth, Lee, Chritton & Wiles,
Attys.

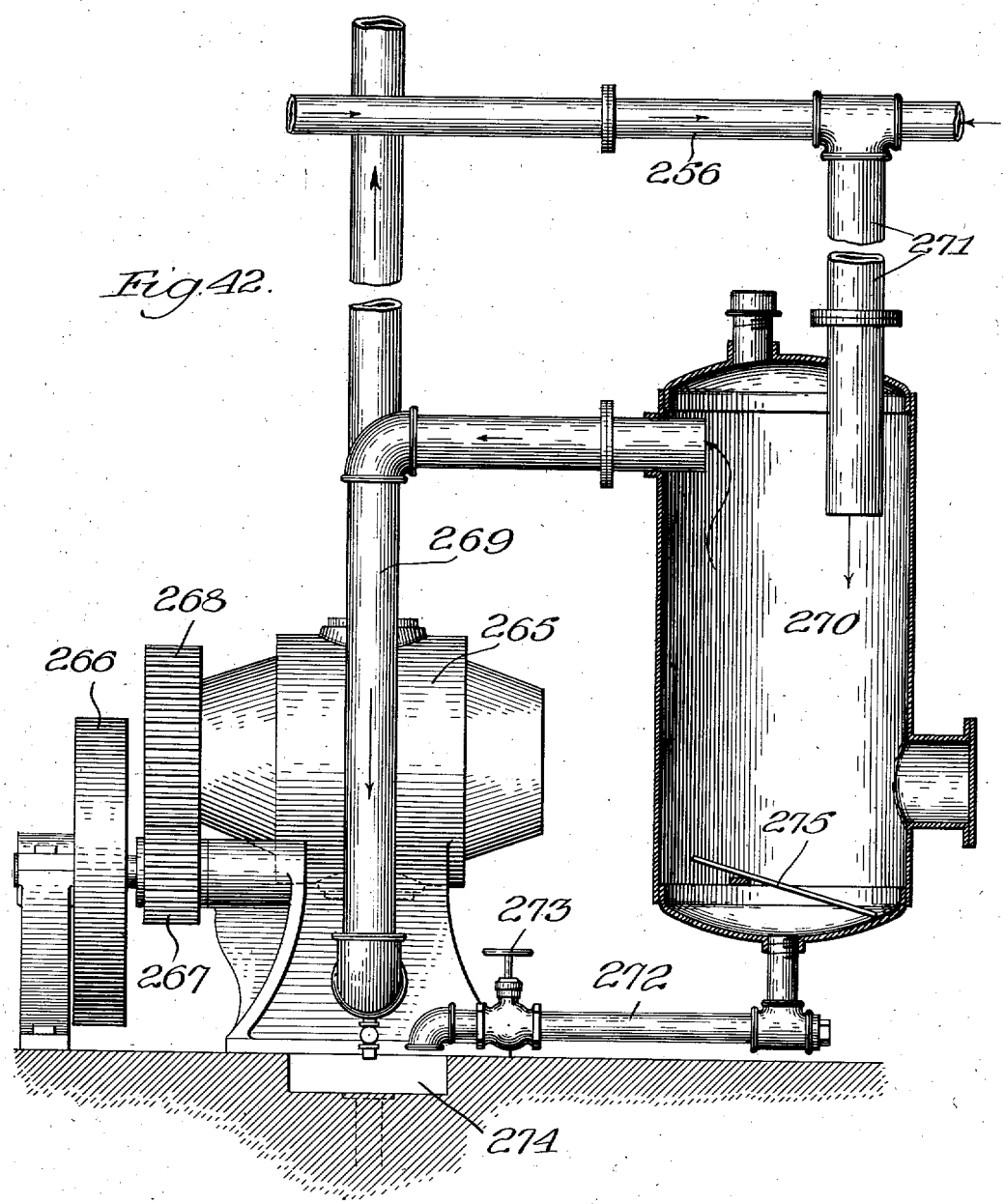

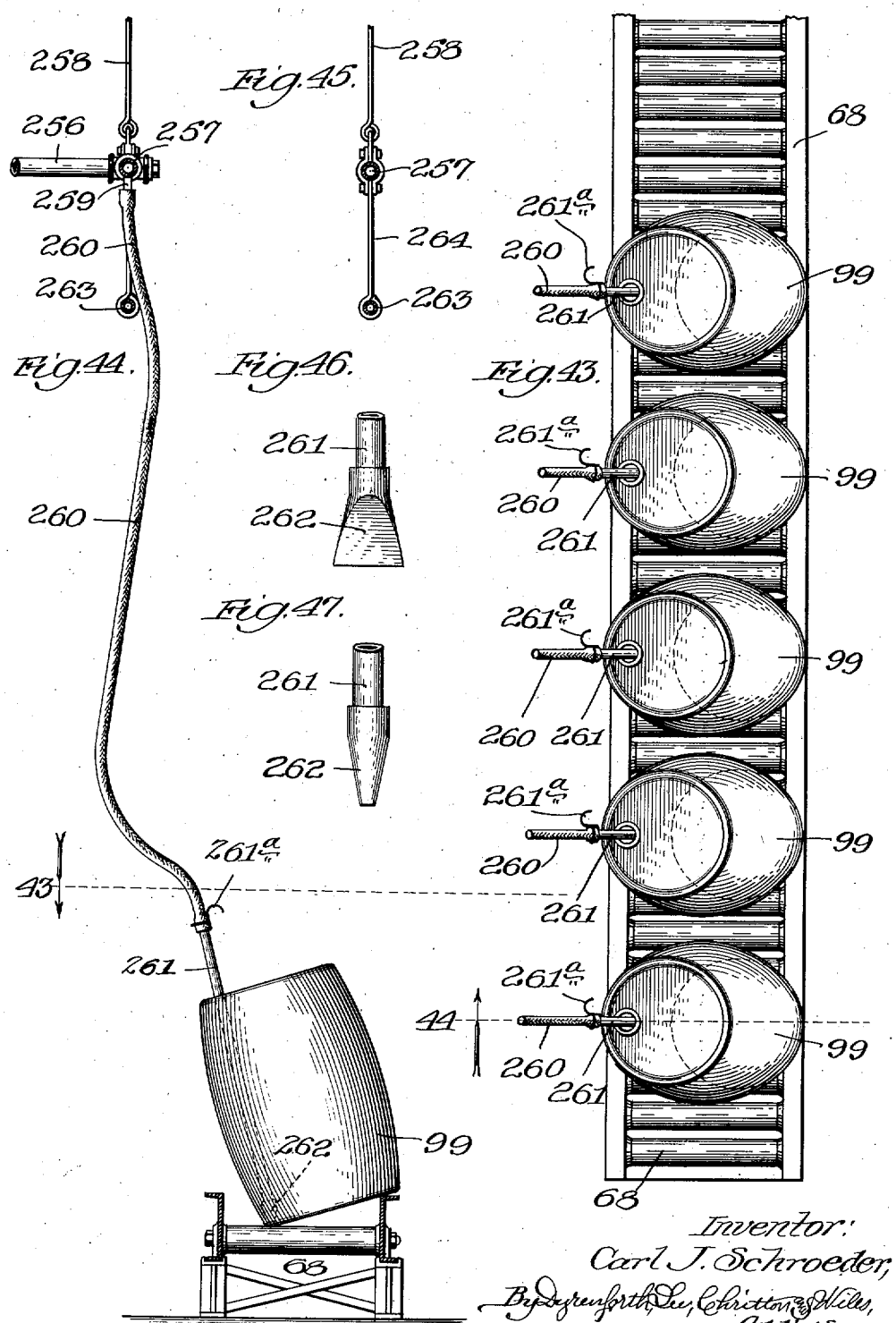

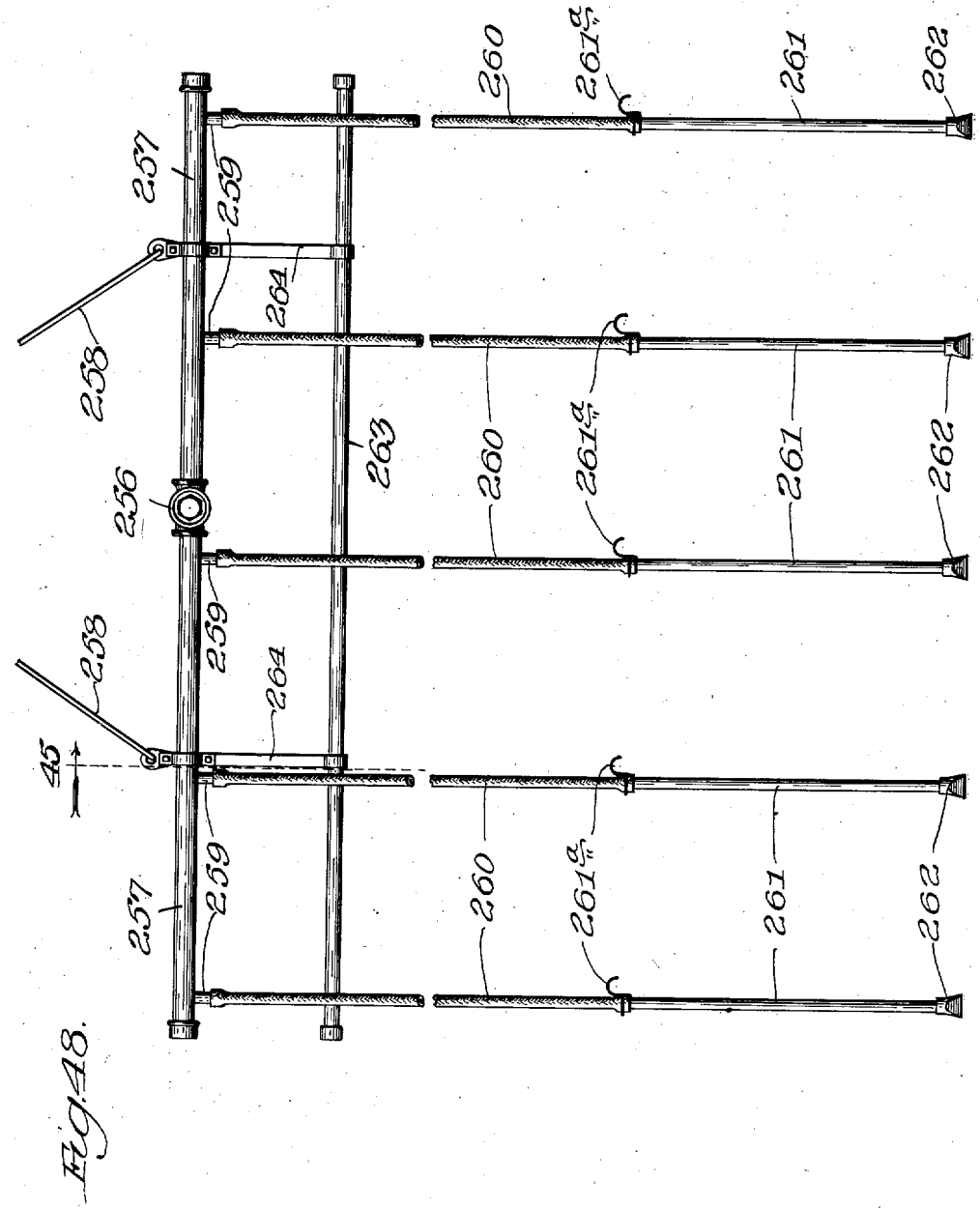

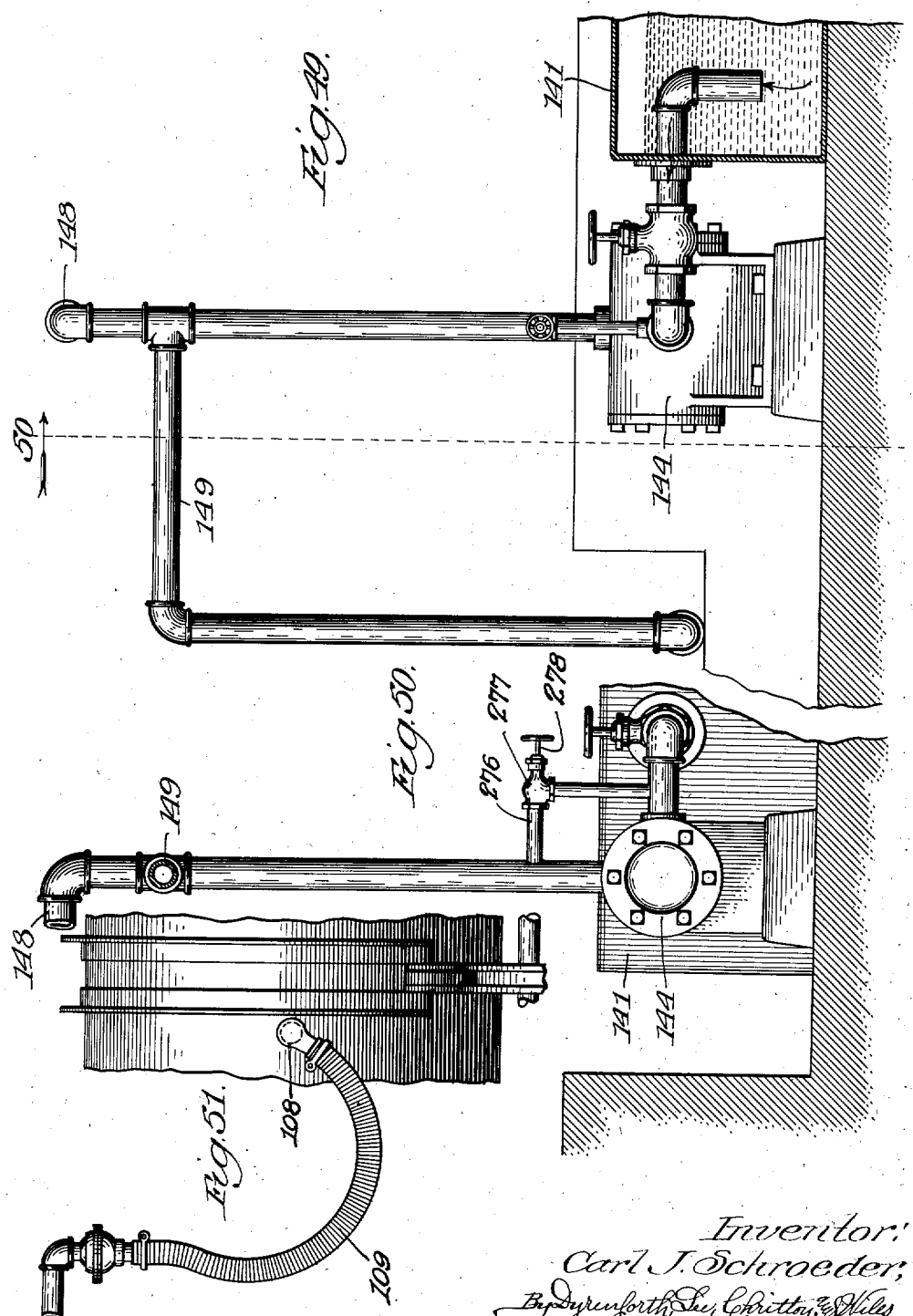

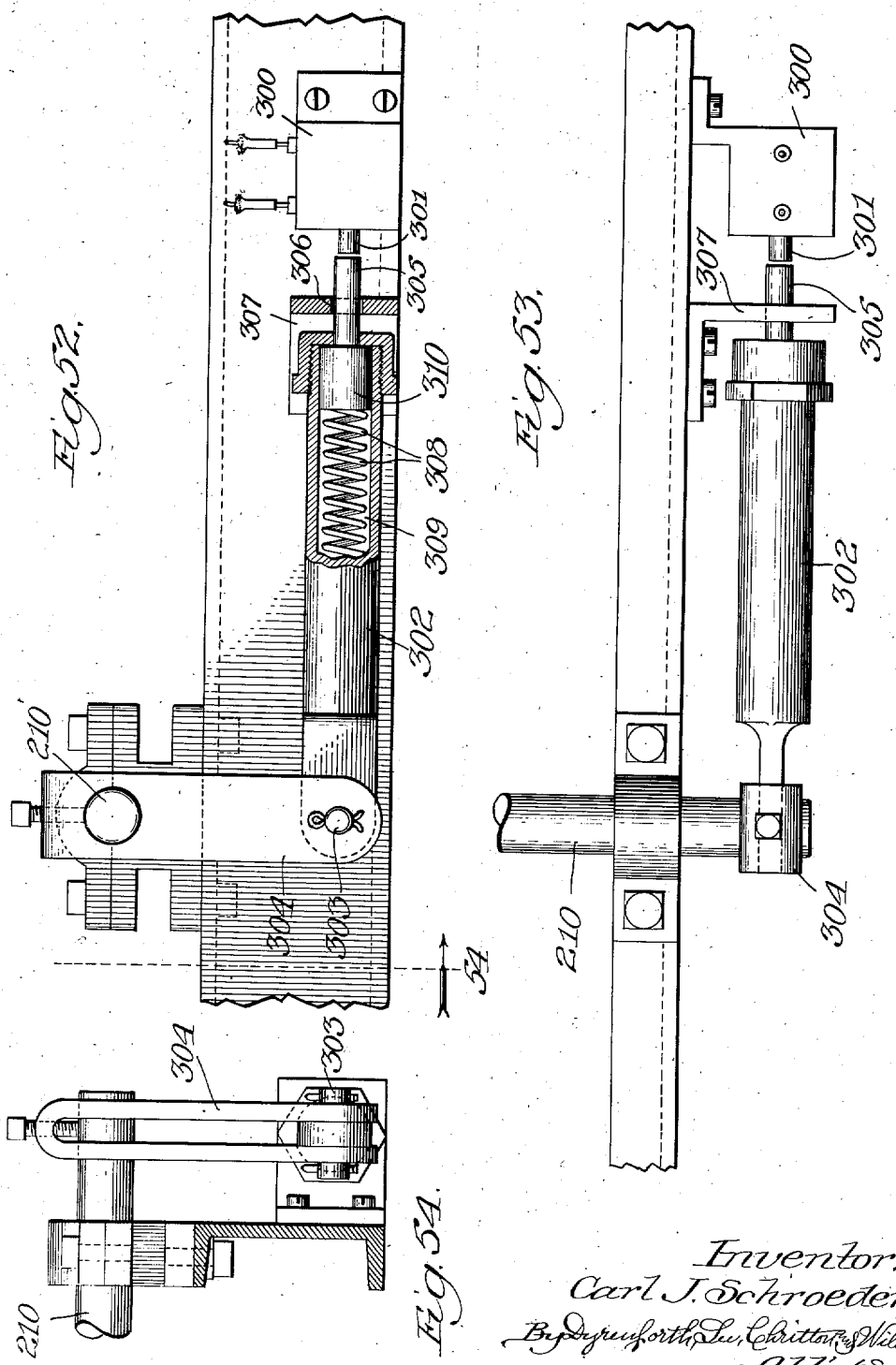

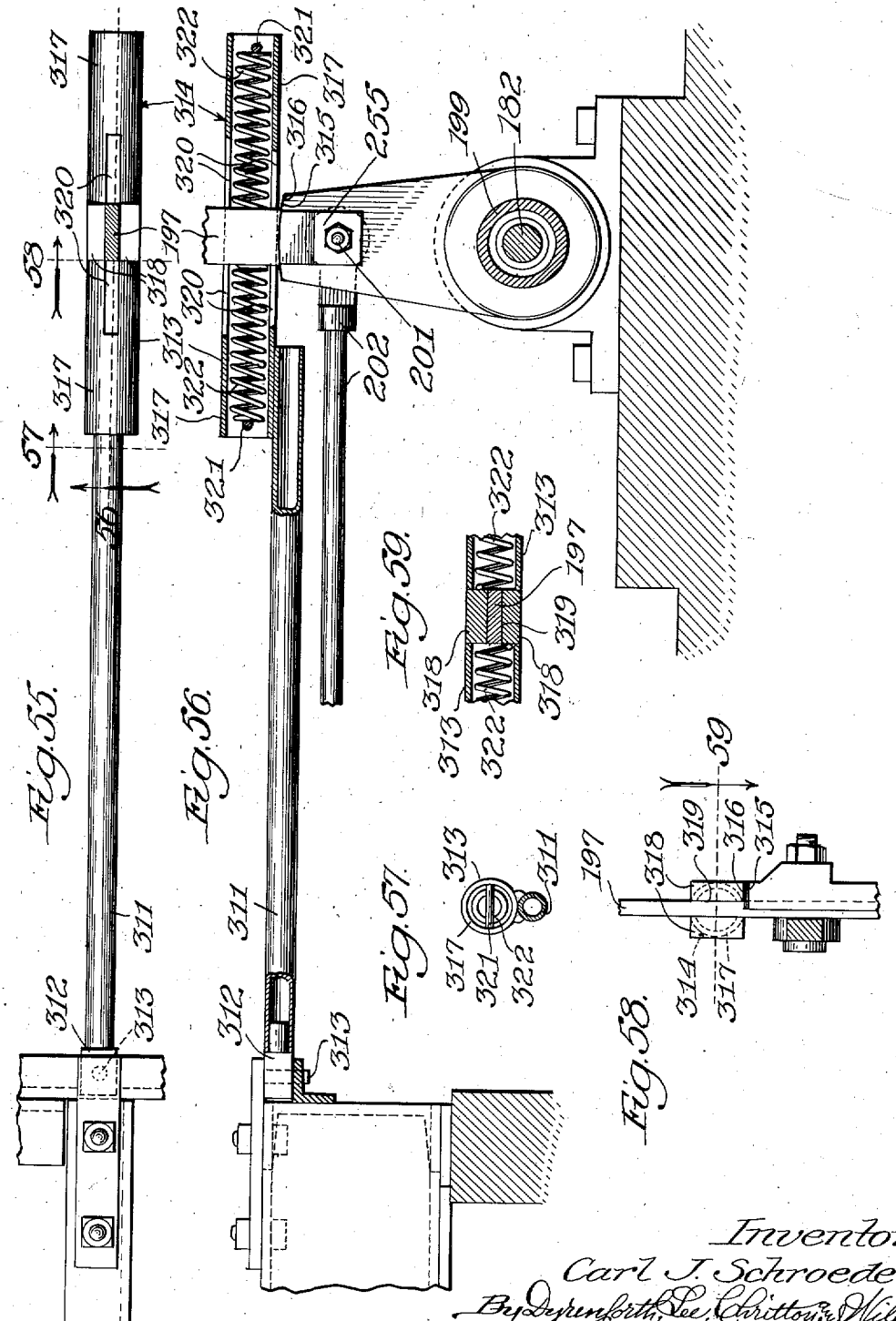

Patented Oct. 27, 1936

2,058,728

UNITED STATES PATENT OFFICE 2,058,728

BARREL WASHING APPARATUS

Carl J. Schroeder, Chicago, Ill., assignor to Standard Oil Company, Whiting, Ind., a corporation of Indiana Application February 1, 1929, Serial No. 336,681

36 Claims. (Cl. 141—6)

My object, generally stated, is to provide improvements in barrel-washing apparatus to the end that the operation of washing the barrels may be expeditiously, economically and effectively performed and with the minimum amount of labor.

Referring to the accompanying drawings:—

Figure 1 is a broken plan view of a barrel-washing installation with certain portions thereof omitted.

Figure 2 is a similar view with certain of the parts omitted in Fig. 1, illustrated.

Figure 3 is a plan view of the mechanism for effecting the rotation of the barrel-housings for rotating the barrels from horizontal position to up-ended position and returning them to horizontal position, and the mechanism for controlling the spraying of liquid against the barrels.

Figure 4 is a section taken at the line 4 on Figs. 1, 3 and 6 and viewed in the direction of the respective arrows, this view showing one of the similar barrel-housings of the apparatus, the housing being shown in the position it assumes for receiving the barrels.

Figure 5 is a similar view showing the barrel-housing positioned to invert the barrels preliminary to the washing of the interiors and exteriors thereof.

Figure 6 is an enlarged sectional view taken at the line 6 on Fig. 1 and viewed in the direction of the arrow.

Figure 7 is a section taken at the line 7—7 on Fig. 6 and viewed in the direction of the arrow.

Figure 8 is an enlarged sectional view of a detail of the barrel-housing, the section being taken at the line 8 on Fig. 6 and viewed in the direction of the arrow.

Figure 9 is a similar view taken at the line 9 on Fig. 6 and viewed in the direction of the arrow.

Figure 10 is a section taken at the line 10 on Figs. 3 and 6 and viewed in the direction of the respective arrows.

Figure 11 is a similar view showing the housing rotated into a position in which the barrels are inverted and the spray nozzles are introduced therein.

Figure 12 is a broken plan sectional view taken at the line 12 on Fig. 10 and viewed in the direction of the arrow.

Figure 13 is a section taken at the line 13 on Fig. 6 and viewed in the direction of the arrow.

Figure 14 is an enlarged broken section taken at the line 14 on Fig. 12 and viewed in the direction of the arrow, this view showing a centering device for the barrels.

Figure 15 is a view in plan of a portion of the centering device of Fig. 14 showing the supporting and locking means therefor.

Figure 16 is a section taken at the line 16 on Fig. 14 and viewed in the direction of the arrow.

Fig. 17 is a view in elevation, partly sectional, of one of the similar spray nozzles employed, the section being taken at the line 17 on Fig. 11 and viewed in the direction of the arrow.

Figure 18 is a plan view of that portion of the apparatus comprising the means for supplying washing fluid to the barrels.

Figure 19 is a plan sectional view of one of the heating-tanks for the barrel-cleansing liquid, the section being taken at the line 19 on Fig. 20 and viewed in the direction of the arrow.

Figure 20 is a view in sectional elevation of the tank of Fig. 19, the section being taken at the lines 20 on Figs. 18 and 19 and viewed in the direction of the respective arrows.

Figure 21 is a view in sectional elevation of a detail of the tank of Figs. 19 and 20, the section being taken at the line 21 on Fig. 19 and viewed in the direction of the arrow.

Figure 22 is a broken plan detail view of a portion of the apparatus shown on Fig. 18 and by which washing fluid is introduced into the barrels to be washed.

Figure 23 is a view in elevation of the portion of the apparatus by which the washing solution is supplied to the barrels for washing, this view being taken at the line 23 on Fig. 18 and viewed in the direction of the arrow.

Figure 24 is a broken section taken at the line 24 on Fig. 22 and viewed in the direction of the arrow.

Figure 25 is a broken section taken at the line 25 on Fig. 22 and viewed in the direction of the arrow.

Figure 26 is a broken section taken at the irregular line 26—26 on Fig. 10 and viewed in the direction of the arrows.

Figure 27 is an enlarged detail, in elevation, of the means in the tank of Fig. 19 for heating the liquid therein, a portion of these means being shown in section, the section being taken at the line 27 on Fig. 19 and viewed in the direction of the arrow.

Figure 29 is a section taken at the line 29 on

Figure 28:
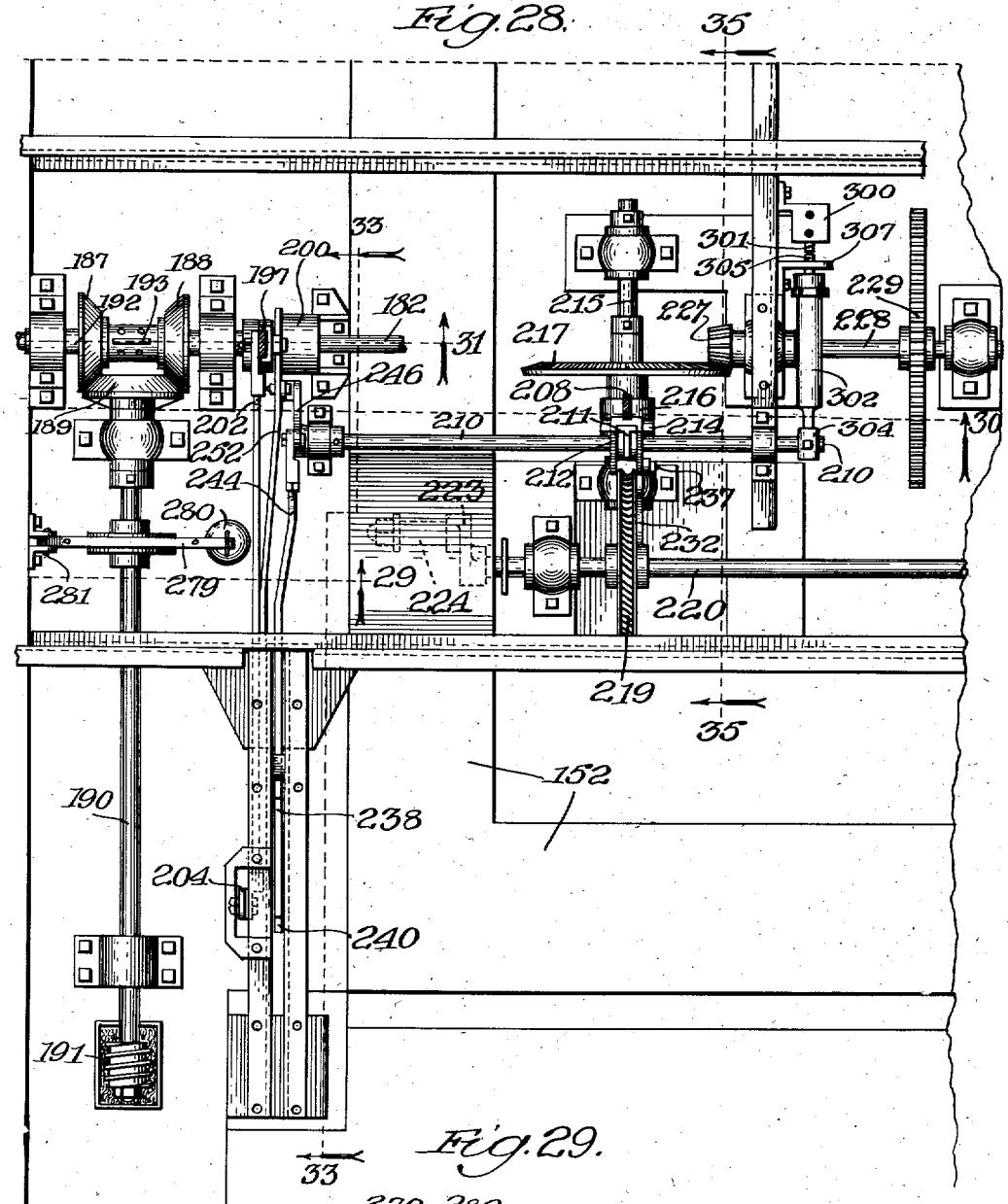
Figure 28 is an enlarged broken plan view of a portion of the mechanism controlling the rotation of the barrel-housings and the supplying of cleansing fluid to the barrels.

Fig. 28 and viewed in the direction of the arrow showing the means for preventing overrun of the mechanism which rotates the barrel-housing.

Figure 30 is a section taken at the line 30 on Fig. 28 and viewed in the direction of the arrow.

Figure 31 is an enlarged section taken at the line 31 on Fig. 28 and viewed in the direction of the arrow, this view showing the mechanism for controlling the driving of the barrel housing in opposite directions.

Figure 32 is a section taken at the line 32 on Fig. 31 and viewed in the direction of the arrow.

Figure 33 is a section taken at the irregular line 33—33 on Fig. 28 and on the irregular line 33 on Fig. 34 and viewed in the direction of the respective arrows.

Figure 34 is a plan section taken at the line 34 on Fig. 33 and viewed in the direction of the arrow.

Figure 35 is a section taken at the line 35—35 on Fig. 28 and viewed in the direction of the arrows.

Figure 36 is a section taken at the line 36—36 on Fig. 35 and viewed in the direction of the arrows.

Figure 37 is a plan section taken at the line 37—37 on Fig. 35 and viewed in the direction of the arrows.

Figure 38 is a perspective view of one of the elements of the mechanism shown in Fig. 35.

Figure 39 is a sectional view of the mechanism shown in Fig. 33, the section being taken at the irregular line 39—39 on Fig. 40 and viewed in the direction of the arrows.

Figure 40 is a section taken at the line 40 on Fig. 33 and viewed in the direction of the arrow.

Figure 41 is a broken sectional view taken at the irregular line 41—41 on Fig. 33 and viewed in the direction of the arrows.

Figure 42 is an enlarged view in elevation, partly sectional, and with certain parts broken away, of the apparatus for drying the interiors of the barrels after cleansing, the section being taken at the line 42 on Fig. 1 and viewed in the direction of the arrow.

Figure 43 is a plan view of one of the skidways shown in Fig. 1 for receiving the barrels after cleansing and on which they are positioned for the removal therefrom of the moisture remaining therein, this view showing a plurality of the barrels in place on the skidway with suction pipes extending into the barrels, this view being taken at the line 43 on Fig. 44 and viewed in the direction of the arrow.

Figure 44 is a broken section taken at the line 44 on Fig. 43 and viewed in the direction of the arrow.

Figure 45 is a sectional view of a detail of the arrangement of suction pipes shown in Figs. 43 and 44, the section being taken at the line 45 on Fig. 48 and viewed in the direction of the arrow.

Figure 46 is a view in elevation of one of the similar suction nozzles employed.

Figure 47 is a similar view of the suction nozzle viewing it normal to Fig. 46.

Figure 48 is a face view of the suction-pipe arrangement referred to.

Figure 49 is an enlarged broken section taken at the irregular line 49—49 on Fig. 18 and viewed in the direction of the arrows.

Figure 50 is a section taken at the line 50 on Fig. 49 and viewed in the direction of the arrow.

Figure 51 is a broken view in side elevation of one of the barrel-housings showing the connection of the spray pipes therein with the source of liquid to be discharged through these pipes.

Figure 52 is a detail view of switch mechanism controlling the operation of the motors for supplying liquid to the spray-pipes.

Figure 53 is a plan view of the mechanism of Fig. 52.

Fig. 54 is a broken section taken at the line 54 on Fig. 52 and viewed in the direction of the arrow.

Figure 55 is a broken plan sectional view taken at the line 55 on Fig. 33 and viewed in the direction of the arrow.

Figure 56 is a view in side elevation, with certain parts sectioned, of the mechanism of Fig. 55, the section line for the sectioned parts being indicated at 56 in Fig. 55 and the section being viewed in the direction of the arrow.

Figure 57 is a section taken at the line 57 on Fig. 55 and viewed in the direction of the arrow.

Figure 58 is a section taken at the line 58, on Fig. 55 and viewed in the direction of the arrow; and Figure 59, a fragmentary sectional view of a detail of the mechanism of Fig. 55.

As a preface to the following description of the particular apparatus illustrated, it may be stated that the apparatus involves, generally stated, skidways along which the barrels to be washed are moved into rotatably supported barrel-housings which are rotated through approximately 90° to cause the barrels to extend in inverted position with their bung-holes opening downwardly and in registration with spray pipes which are thereupon elevated through the bung-holes to spray cleaning liquid, as for example, caustic soda solution, against the internal barrel-surfaces to be cleaned, the barrels thus housed in this position being also subjected externally to cleansing liquid, as for example that just specified.

Following the cleansing operation the housings are rotated back to their original position and the barrels rolled therefrom along skidways into other similar housings which are rotated to invert the barrels with their bung-holes downward in which position the barrels are washed internally and externally as for example with clear hot water to wash away the caustic soda. These housings are then rotated back to original position, and the barrels rolled therefrom upon a skidway upon which the operator up-ends the barrels and subjects the interior thereof to suction action for removing such vapor and liquid as may remain in the barrels, from which skidways the barrels are delivered, in substantially dry condition, to a skidway for conducting them to the painting and filling departments.

In the particular arrangement shown provision is made for operating upon four lines of barrels, but as the apparatus for operating upon each pair of lines is the same, the apparatus for operating on one pair only of lines is shown in detail.

In the arrangement shown a barrel-washing house is represented at 60, one end wall 61 of the house communicating with tunnels 62 two only of which are shown, one for each line of barrels, these tunnels extending to barrel-storage sheds from which the barrels are fed through the tunnels to the wash-house by any desirable means.

The wash-house contains skidways 63 in alinement with the respective tunnels and along which the barrels to be washed are rolled, the barrels extending crosswise of these ways. At the forward ends of the ways 63 are barrel-housings 64 into which the barrels are rolled from the skidways 63 and in which the barrels are externally and internally washed, as for example by spraying caustic soda solution against them. At the front ends of the housings and in alinement therewith are skidways 65 along which the cleansed barrels are rolled to a second set of barrel-housings 66 wherein the barrels are subjected to a rinsing action, preferably by spraying hot water against them both internally and externally. At the front ends of the housings 66, and in alinement therewith, are skidways 67 which extend to, and are in alinement with, racks 68 to which the rinsed barrels are delivered and on which the barrels are supported in upended condition and subjected internally to suction. Extending crosswise of the skidways 68 at the forward ends of the latter is a skidway 69 along which the cleaned and dried barrels roll through an opening 70 in the side wall 71 of the barrel-washing house, as for example to another part of the house containing a painting machine by which the barrels are painted and from which they are conducted to suitable drying ovens.

A skidway 72 located between the lines of skidways just described and extending from the transverse skidway 69 to a point adjacent the inlet ends of the housings 64 is provided to receive such of the barrels, if any, as may not have been properly washed and along which they are returned to be again passed through the washing and rinsing housings and operated on by the suction apparatus.

As each of the housings 64 and 66 are of the same construction and have associated therewith mechanism of the same construction for rotating the housings and spraying the barrels, the description, except as hereinafter noted, will be limited to the one of the housings 64 which is at the lower edge of Fig. 1.

The housing 64 is of general cylindrical form, it being rotatably supported on grooved rollers 73 fixed on a shaft 74 journalled in bearings 75 on the floor of the house and extending to one side of the vertical axis of the housing and upon grooved rollers 76 having inset gear portions 77 secured to a shaft 78 also journalled in bearings on the floor of the house and extending at the opposite side of the vertical axis of the housing, the shaft 78 being provided with a worm wheel 79 by means of which the gear rollers 76 are rotated, as hereinafter described, to partially rotate the housing first in one direction and then in the other.

The housing is provided at its ends, and intermediate its ends, with circumferentially disposed flange members 80 at which the housing rests on the rollers 73 and 76, the members 80 having rack segments 81 which extend into the grooved portions of the rollers 73 and 76 and mesh with the gear portions 77 of the rollers 76.

The side wall 82 of the housing is open throughout the greater portion of its length, as represented at 83, to permit access to the barrels in the housing for the purpose hereinafter set forth, the housing being provided internally with a barrel-runway 84 extending lengthwise thereof and shown as formed of spaced parallel angle irons located at substantially the same level as the skidways 63 and 65, and to one side of the runway 84 with a pair of angle irons 85 and 86 forming abutments for one end of the barrels, the angle irons 84, 85 and 86 being carried by frames 87 (Fig. 13) located at the ends of the housing and a similar frame located intermediate the ends of the housing, these frames being shown as integral with the flange members 80.

The ends of the housing are provided with doors 88 (Figs. 4, 5 and 7) of circular form and confined on the housing and movable automatically from the open position shown in Fig. 4 (which they occupy when the housing is in normal position) to closed position when the housing is rotated to the position shown in Fig. 5, and back to open position when the housing is returned to normal position.

The means shown for confining the doors for the movements just described, comprise a semi-circular inwardly-opening channel 89 at each end of the housing shown as formed of a semi-circular flange 90 extending outwardly from the end of the housing and a semi-circular angle iron 91 secured to the flange 90 with the inwardly extending flange portion 92 of the angle iron 91 spaced from the end wall of the housing. Each door is provided on its outer face with a circular flange 93 of smaller diameter than the body portion of the door and concentric therewith and disposed in overlapping relation to the flange 92 these parts cooperating to form stop means limiting the downward movement of the doors in the rotation of the housing from the position shown in Fig. 4 to that shown in Fig. 5 and causing the doors to be in closed condition. The ends of the flange 90 are extended laterally of the housing to form the parallel strip portions 94 which in the normal position of the housing (Fig. 4) incline slightly downwardly, their terminal portions being curved toward each other as represented at 95 to form stops limiting the outward movement of the doors as shown in this figure, the strip members 94 being shown as braced by struts 96 secured thereto and to the body portion of the housing.

Connected with the members 94 are angle irons 97 presenting inwardly extending flanges and between which and inwardly extending flanges 98 of the members 94 the peripheral edges of the doors extend.

As hereinbefore stated, the barrels represented at 99 are rolled into the barrel-housings while positioned on their sides as shown in Figs. 4, 6 and 7 in which operation the housings are in the position shown in Fig. 4, the doors of the housings being open. The housings are then rotated, by the gear and rack mechanisms 77 and 81 to the position shown in Fig. 5 in which the doors automatically roll to closed position. The barrels are introduced into the housing as stated, with their bung openings 100 (Fig. 14) extending to the left of the housing (Figs. 4, 10, 11, 13 and 14) and thus rotation of the housings to the position shown in Fig. 5 causes the barrels to become inverted with their bung openings extending downwardly. In this position of the barrels they are sprayed externally and internally by cleansing fluid supplied through vertically movable spray pipes raised into the barrels through their bung openings. It is thus necessary that the barrels 99 be so positioned in the housings that upon inversion as stated, their bung openings will be in alinement with the spray pipes and this is effected by providing the housings with series of positioning, or guide, members so disposed that when the bung holes of the barrels in the housing are lined up with these positioning members the bung holes will be properly positioned for receiving the spray pipes.

The positioning members shown are in the form of tubes 101 rotatably and slidably mounted in supporting bearings 102 provided on the angle iron 85, the outer ends of these tubes being flared as represented at 103 and equipped with handle portions 104. The tubular members 101 are provided with laterally-projecting pins 105 which extend into bayonet-slots 106 in the bearing members 102. Coil springs 107ᵃ surrounding the flared portions 103 of the tubes yieldingly force the tubular members 101 towards the barrels to the position shown in Figs. 14 and 15 and exert force on these members rotating them clockwise in Fig. 16.

The pins 105 and slots 106 are so proportioned and arranged, as shown, that when the parts are in the position shown in Figs. 15 and 16 the inner ends of the members 101 extend into the bung holes of barrels positioned opposite to them, but when the operator rotates the members 101 counterclockwise in Fig. 16 and pulls outwardly thereon and the pins 105 interlock with stop-surfaces 106ᵃ of the slots 106, the inner ends of the members 101 will be withdrawn from inwardly projecting position.

It may be here stated that following the rolling of the barrels into the housings, the operator individually rotates the barrels to cause their bung openings to be in alinement with the respective guide-members 101 whereupon the latter are given a slight turn counterclockwise in Fig. 16 and they are pulled inwardly by the action of the springs 107ᵃ, to the position shown of the one in Figs. 13, 14 and 15 thereby ensuring the registration of the bung holes with the internal spray pipes hereinafter described.

The means shown for spraying cleansing liquid, such as caustic soda solution, upon the exterior surfaces of the barrels in the housings 64, and rinsing liquid, such as hot water, upon the barrels in the housings 66, comprise a pipe 107 located within each housing and extending lengthwise thereof along one side, this pipe opening between its ends at an inlet portion 108, into a flexible pipe 109 (Fig. 51) connected with a source of supply of the liquid to be sprayed. The pipe 107 also opens into a curved pipe 110 located between the ends of the housing and extending crosswise of the axis thereof closely adjacent the inner surface of the side wall 82, the pipe 110 opening into pipes 111, 112 and 113 located within the housing and extending lengthwise thereof and grouped about the axis of the housing. The pipes 111 and 112 open into branch, spray, pipes 114 and 115, respectively, and the pipe 113 into inwardly extending branch, nozzled, pipes 116, the pipes 114, 115 and 116 being disposed in series along the housing. The branch pipes 114 and 115 are so disposed that they will extend into the spaces between adjacent barrels and the nozzles 116 are so disposed as to directly oppose ends of the barrels along one side of the housing, all as shown in Fig. 7.

The means for directing the liquid into the interiors of the barrels for cleansing them in the first operation and for rinsing them in the next, comprise a series of upwardly extending pipes 117 provided at their upper ends with spray-heads 118, these pipes being connected at their lower ends with a pipe 119 journalled at its ends on ends of pipes 120 and 121 and opening into the pipe 121, the pipes 120 and 121 being pivotally supported on alining axes at 122ᵃ and 123ᵃ.

The pivotal support 122ᵃ for the pipe 120, shown in detail in Fig. 25, comprises an axle 124 extending through a T 120ᵃ at the end of the pipe 120 and on which said T is journalled, the axle 124 being supported at its ends by brackets 125 secured to the side walls of a housing structure hereinafter described, the axle being made fast to one of said brackets.

The pivotal connection of the pipe 121 at 123ᵃ is shown in detail in Fig. 24 and comprises a flanged ring 126 surrounding the inner end of a pipe section 127 secured in a coupling 128 connected with a wall of the housing just referred to, the inner end of this pipe section being annularly flanged as represented at 129. A flanged ring 130 surrounds the inner end of this pipe section and, between the flange of this ring and an offset portion 131 of the elbow 132 of the pipe 121, the flange 129 is clamped by bolts 133 engaging the flange 134 of this elbow and the ring 126. The pipe through which the liquid is supplied to the nozzles is represented at 135 and screws into the outer end of the coupling 128.

The pipes 117 extend through guide openings 136 in plates 137 located in the housing structure last referred to, these spray pipes being pressed against the left-hand edges (Fig. 10) of the openings 136 by weight-arms 117ᵃ fixed to pipe 119, and so spaced that they extend in vertical alinement with the openings through the members 101 and consequently the bung-holes 100 of the barrels, when the barrel housing is rotated to the position shown in Fig. 11 so that when these spray pipes are raised, as hereinafter described, they will enter the barrels, and assume the elevated position shown in Fig. 11.

In the arrangement shown two caustic soda solution tanks, represented at 138, are provided, one serving to supply the barrel-housings 64 for two adjacent lines of the barrels and the other to supply the liquid to the other two housings 64 for the other two lines of barrels, each of the tanks 138 being preferably associated with means (not shown) for introducing live steam into the solution for heating it to the desired temperature.

The tank 138 (Fig. 18) communicates at its lower end with an outlet pipe 139 having a hand valve 140 and opening downwardly into a heating tank 141 associated with means for heating the contents thereof, this tank having outlet pipes 142 and 143 which open into the suction inlets of pumps 144 and 145 shown as driven by electric motors 146 and 147, respectively. The outlet of the pump 144 communicates, by a pipe 148, with the flexible inlet pipe 109 of one of the barrel housings 64 and also, by a pipe 149, with the pipe 135; and the outlet of the pump 145 communicates with pipes 150 and 151, the pipe 150 communicating with the pipe 109 of the other barrel housing 64 of the pair thereof, and the pipe 151 communicating with the pipe 135 opening into the spray mechanism, above referred to, cooperating with the barrels in this particular barrel-housing.

Provision is made for re-circulating through the tank 141 the caustic soda solution after it has been used for the washing of the barrels, and to this end the housings 64 are positioned over tanks, or housings 152 hereinbefore referred to and in which the pivoted spray-pipe-equipped structure above described, is located, the tank 152 being provided along one edge with an upwardly extending curved side portion 153 flanged at its ends as represented at 154 which serves, upon rotating the barrel-housing above it to the position shown in Fig. 11, to substantially close the opening 83 in the side of the barrel-housing, except at the portion of this opening which extends into registration with the open, upper, top of the tank 152 (Fig. 11). The housing 64 extends into the space between the flanges 154, its side wall being flanged along one side of the opening 83 as represented at 155, this flange opposing the adjacent side wall of the tank 152 when the housing is in the position shown in Fig. 11 and preventing splashing of the liquid out of the course through which it flows in draining, from the barrels, through the barrel-housing to the tank 152 beneath it.

In the arrangement shown the tank 152 is so shaped and proportioned as to be positioned for cooperation with a pair of the barrel housings 64, as shown in Fig. 18, the lower end of this tank being connected by a pipe 156 with the inlet 157 (Fig. 19) of the tank 141 thereby permitting of the re-circulation of the caustic soda solution as above stated.

The contents of the tank 141 are maintained in the desired heated condition by any suitable means, as for example by live steam supplied, from any suitable source, to a pipe 158 terminating in a jet-nozzle 159 (Fig. 27) located within a pipe 160 supported in the tank 141. The pipe 160, which is immersed in the liquid in the tank 141, is open at one end as represented at 161, its other end being closed except for liquid inlets 162 located adjacent to the jet-nozzle 159, the steam discharging through the nozzle 159 producing a circulation of the liquid through the pipe 160.

The tank 141 is preferably provided with means for straining from the liquid returned thereto from the tank 152, such solid matter as may be contained therein, and to this end is provided with partitions 163 and 164 having screen-portions 165 and 166, respectively, extending across the tank and arranged in staggered relation to each other. The pipe 160 is located between these two partitions; the inlet 157 is located at one end of the tank beyond both partitions and the outlets 142 and 143 at the other end of the tank beyond the partitions, whereby liquid entering the tank 141 through the inlet 157 must pass through both of the screens 165 and 166 before being withdrawn from the tank. The pipe 139 opens into the portion of the tank 141 into which the pipes 142 and 143 open, or in other words, in front of both of the screen devices, as it is unnecessary to subject the liquid discharging from the pipe 139, to a screening action.

The tank 141 contains a drain outlet 167 (Fig. 21) communicating with a pipe 168 which may lead to a sewer, the drain outlet 167 being controlled by a valve 169 mounted on the lower end of a pipe 170, open to the upper end of the pipe 168 and slidable up and down in the tank. The upper end of the pipe 170 is open to form an overflow for the tank should the solution therein extend above the level indicated at 171, the tank being preferably provided with a gage rod 172 slidable upon the tank and provided at its lower end with a float 173 within the tank.

The upper end of the pipe 170 is shown as connected with a rod 174 by a pin 170ᵃ engaging a lever 175 pivoted at 176 on an upright 177 forming a guide for the gage rod 172, the lever 175 serving as a means for raising the combined pipe and valve 170—169 when it is desired to drain the tank 141 of its contents.

Inasmuch as it is desirable that the tanks 138 and the tanks 141 be vented of the vapors produced by the introduction of steam into the liquids in these tanks, and such gases or vapors as may be generated by the washing of the barrels I provide a vent pipe 178 (Fig. 23) which opens into the top of one of the tanks 138 and, by a branch pipe 179 into the top of the other tank, the pipe 178 opening also into a pipe 180 which opens into the top of the tanks 141, and by a branch pipe 181 into the top of the other of the tanks 141.

Each of the housings 64 and 66 has associated therewith mechanism controlling the rotation of the housings independently of each other first in one direction and then in the other for the purpose above stated and mechanism controlling the raising and lowering of the spray pipes for supplying liquid to the interiors of the barrels and for controlling the supplying of liquid to these spray pipes and the spray pipes in the housings through which the liquid is supplied to the exterior surfaces of the barrels.

The following is a description of the mechanism controlling the movement of the barrel housings, this mechanism being the same for each housing.

Located between each pair of housings 64 and 66 and extending lengthwise thereof, are line shafts 182 independently operated by motors 183, the motors being connected with these shafts through the medium of sprockets 184—185 and a connecting sprocket chain 186. The line shaft 182 is provided with a pair of friction cones 187 and 188 (Figs. 3, 28 and 31) constantly driven by the shaft 182 and shiftable lengthwise thereon for alternate engagement with a friction driven cone 189 rigid on a shaft 190 having a worm 191 which meshes with the worm wheel 79 and by which the gear rollers 76 are driven. The driving cones 187 and 188 are rigid on a sleeve 192 (Fig. 31) slidable lengthwise on the line shaft 182 and splined thereto by a key 193 carried by the sleeve 192 and extending into a keyway 194 in the shaft 182. One end of the sleeve 192 is provided with a head 195 rotatably confined within the lower, hollow, end 196 of a lever 197 rotatably supported, at an externally threaded portion 198 surrounding the shaft 182, on a bearing member 200 provided internally with a thread 199 with which the thread 198 engages, whereby when the lever 197 is rocked in one direction one of the cone drives 187 and 188 will be in driving engagement with the driven cone 189 and when this lever is rocked in the other direction the driving of the cone 189 will be through the other of the cone drives.

The lever 197 is pivoted, as indicated at 201, to one end of a rod 202, its opposite end being pivotally connected, as indicated at 203 to a lever 204 stationarily pivoted at its lower end, as indicated at 205, the upper end of the lever 204 (Fig. 39) extending into the path of movement of members 206 and 207 provided on one end of the barrel housing in peripherally spaced relation (Figs. 33, 39 and 40). The rotation of the barrel housing from the position shown in Fig. 10 to that shown in Fig. 11 is effected by the operator swinging the lever 197 to the right in Figs. 33 and 39 in which operation the lever 204 is rocked to the right in Fig. 39 and into the path of movement of the member 206 immediately preceding the final movement of the housing to the position shown in Fig. 11, the continued rotation of the barrel-housing swinging the lever 204 to the left in Fig. 39 and drawing the lever 197 to neutral position in which the shaft 190 is disconnected from the line shaft 182 and the barrel-housing becomes positioned as shown in Fig. 11. To reversely rotate the barrel housing to the normal position shown in Fig. 10 the operator rocks the lever 197 to the left in Fig. 33 which moves the lever 204 to the left in Fig. 39 and into the path of movement of the member 207 immediately preceding the positioning of the barrel-housing as shown in Fig. 10, further movement of this housing toward said position swinging the lever 204 back to normal position which in turn swings the lever 197 to neutral position. Thus while the lever 197 is set by the operator to rotate the barrel-housing in one direction, or the other, as desired, the stopping of the barrel-housing in either of the desired definite predetermined positions, is effected automatically.

The mechanism for controlling the raising and lowering of each set of spray pipes 117 and the supplying of liquid to these pipes and to the spray pipes mounted in the barrel-housing is as follows: This mechanism comprises a lever 208 provided at its lower end with a yoke member 209 fixed thereto (Fig. 35) and at which it is journalled on a shaft 210 journalled in stationary bearings, the yoke 209 straddling the upper end 211 of a link 212 (Figs. 35, 36 and 38), rigidly mounted at its upper end on the shaft 210, the lower end of this link having depending spaced arms 213 which straddle a sliding clutch member 214 splined on a shaft 215 and adapted to be moved into and out of interlocking relation with a clutch member 216 rigidly connected with a bevel gear 217 rigid on the shaft 215, the shaft 215 being provided with a worm 218 meshing with a worm wheel 219 rigidly connected with a shaft 220 journalled in stationary bearings 221 and 222 (Fig. 22), the ends of this shaft being provided with cranks 223 journalled at 224 in blocks 225 embracing, and slidable on, the pipes 120 and 121 (Fig. 10), the blocks 225 having rollers 226 journalled thereon to prevent sliding friction between the blocks and these arms.

The gear 217 (Fig. 28) meshes with a bevel pinion 227 rigid on a shaft 228 driven by the line shaft 182 through the medium of a pinion 229 on the latter and a gear 230 on the shaft 228 and meshing with this pinion.

The normal position of the lever 208 is that shown in Fig. 35 in which it extends in overbalanced condition to the right of the axis of the shaft 210 and out of engagement with the part 211 of the link 212, the clutch member 214 being out of operative position. When it is desired to actuate the shaft 220 to raise the spray nozzles 117 into the barrels through the bung holes therein and thereafter withdraw them, the operator swings the lever 208 to the left in Fig. 35 for clutching the clutch element 214 to the clutch element 216 thereby effecting drive between the drive shaft 182 and the shaft 220. The shaft 220 should therefore be caused to make a single revolution only and to effect the automatic disengagement of the clutch 214 from the shaft 215, upon the completion of a single rotation of the shaft 220, I provide a pin 231 on the worm wheel 219 which cooperates with a latch lever 232 having a tooth 233 at one end and pivoted at its opposite end, as indicated at 234, to the link 212, the latch lever 232 being pivotally connected between its ends to the lower end of a link 235, as indicated at 236, the upper end of this link being pivotally connected at 237 to the yoke 209.

The arrangement of the parts just described is such that in the normal position of the lever 208 (Fig. 35) the latch 232 is interlocked at its tooth 233 with the pin 231, the initial movement of the lever 208 to the left in Fig. 35 for throwing the clutch into operative position effecting the lowering of the latch 232 out of engagement with the pin 231, continued movement of this lever shifting the clutch element 214 into engagement with the clutch 216. Upon the operator releasing his grasp on the lever 208 it rocks in clockwise direction in Fig. 35 to a position in which the tooth 233 of latch lever 232 extends into the path of movement of the pin 231 whereby in the final movement of the gear 219 throughout a single revolution, the pin engages the tooth 233 and through the connection of the latch lever 232 with the link 212 withdraws the clutch member 214 from engagement with the clutch member 216 and the shaft 220 comes to rest in the normal position shown in Fig. 35 with the spray pipes in lowermost position (Fig. 10).

The mechanism now being described also comprises means whereby, as the spray pipes 117 start to rise, the liquid to be discharged through these pipes and through the spray pipes mounted in the barrel-housing, may be supplied thereto, this being effected in the particular arrangement shown, wherein the power device for actuating the pump is an electric motor as stated, by providing switch mechanism controlling the flow of current to the motor operated from the mechanism above described as for example, and preferably, from the shaft 210. Such a switch is shown in Figs. 28, 52, 53 and 54, and comprises a switch-device 300 mounted on a stationary part of the apparatus and of the type comprising contacts (not shown) which mutually engage and close the circuit of the one of the motors 146 and 147 cooperating therewith when a push-rod 301 is pressed inwardly and automatically disengage when actuating pressure against this rod is relieved. The push-rod 301 extends into the path of movement of a bar 302 pivoted at 303 to a crank-arm 304, in the form of a yoke, rigid on the shaft 210, the parts being so proportioned and arranged that when the clutch 214 is in inoperating position (Fig. 35) the switch 300 will be open as shown in Fig. 52, but upon the shifting of clutch 214 to operating position, by actuating lever 208 as explained, the shaft 210 will be rotated in a direction to cause the bar 302 to close the switch 300. The bar 302 is preferably formed of a separate rod-section 305 at which it engages the push rod 301, the rod 305 extending slidingly through an opening 306 in a stationary guide bracket 307 to guide the bar 302 in its reciprocations. Preferably the rod 306 is spring-cushioned as by a spring 308 confined in a recess 309 in the bar 302 and pressing outwardly against the rear headed end 310 of rod 305 which is slidable in the recess 309.

It is desired that means be provided whereby the mechanism for raising the spray pipes 117 and supplying liquid thereto and to the spray pipes mounted in the barrel-housing be locked against actuation while the barrel-housing is in the normal position shown in Fig. 10 and while it is moving into and out of the position shown in Fig. 11; and also to lock the barrel-housing-rotating mechanism except when the spray-pipe-elevating mechanism and the liquid-supplying mechanism is in normal position and not operating and to this end I provide the following described mechanism which comprises (Fig. 33) a bell-crank 238 pivoted at its angle on a stationary part of the structure as represented at 239. The upper end of the arm 240 of this lever extends into the path of movement of a lug 241 provided on an end of the barrel-housing and so positioned that when this housing moves to the position shown in Figs. 11 and 33 it will engage this bell crank and rock it to the position shown in Fig. 33. The other arm 242 of this bell crank, in the normal position of the barrel-housing (Fig. 10) rests upon a stationary support 243 and extends into the path of movement of a slide-bar 244 which is pivotally connected at 245 to the upwardly-extending arm 246 of a bell-crank 247 rigidly connected with the shaft 210 operated by the lever 208.

As before stated, the spray pipes 117 are elevated and the liquid supplied thereto when the lever 208 rotates the shaft 210 in counterclockwise direction in Figs. 33 and 35, and as the bell-crank 238, in the normal position of the barrel-housing (Fig. 10) extends into the path of movement of the bar 244 in the movement of the latter to the left, it is impossible to throw the clutch 214 into operative position until the barrel-housing has rotated to the position shown in Figs. 11 and 33. Thus it is impossible to raise the spray pipes and supply liquid to the barrel-housings until, and unless, the barrel-housing has been rotated to the position shown in Fig. 11.

The bell crank 247 is pivotally connected at its other arm 248 with the lower end of a link 249 as represented at 250, the upper end of this link being pivotally connected, as indicated at 251, to a bar 252 pivotally connected at 253 with a stationary part of the structure, the bar 252 containing a notch 254 in its upper edge which, in the neutral position of the lever 197, extends immediately below a block 255 on this lever. In the normal position of the lever 208 the bar 252 extends entirely below the block 255, thereby permitting of the free operation of the lever 197. Upon rocking the lever 208 to raise the spray pipes and supply liquid to the spray devices which, as before stated, can only occur when the barrel-housing is in the position shown in Fig. 11 and the lever 197 is in neutral position, the bar 252 is raised in which position it interlockingly straddles the block 255 thereby locking the lever 197 against operation and preventing the operator from rotating the barrel-housing back to neutral position until the lever 208 has been returned to normal position. Furthermore, lever 208 cannot be manipulated at any time when lever 197 is not in neutral position.

As the apparatus for supplying hot rinsing water to the interiors and against the exteriors of the barrels in the housings 66 is of the same construction as that shown and described for internally and externally cleansing the barrels in the housings 64, detailed description thereof appears to be unnecessary, such of the various illustrated parts of this particular part of the apparatus as correspond with similar parts of the apparatus above described being given corresponding numerals but with prime marks added thereto.

The means for subjecting the interiors of the barrels in up-ended condition on the racks 68 to suction action and hereinbefore referred to comprise a pipe 256 (Figs. 44 and 48) opening at intervals therealong into branch pipes 257 rigidly secured thereto and extending in opposite directions therefrom lengthwise of the racks 68 and arranged above, and opposite to, these racks, this pipe arrangement being shown as connected with rods 258 to be dependingly supported from a ceiling for supporting this pipe arrangement. Each branch pipe 257 is provided with depending pipes 259 spaced apart a distance corresponding substantially to the distance between the centers of adjacent barrels when positioned on the rack 68 as shown in Fig. 43, the branch pipes 259 being connected with flexible hose lines 260 equipped at their lower ends with pipes 261 having flat nozzles 262 at their terminal portions. Rigidly secured to each pair of alining pipes 257 to extend below these pipes is a bar 263 mounted in the lower ends of clips 264 rigid on the pipes 257 and to the upper ends of which the lower ends of the rods 258 are connected. The bar 263 is so positioned, as shown, that the flexible hose lines 260 may be hung therefrom by hooks 261$^a$ attached to the pipes 261 so as to be clear of the operator when not in use.

The nozzle-equipped pipes 261 are provided for insertion into the bung-holes of the barrels as shown in Figs. 43 and 44 for removing from the barrels, by suction action produced in these pipes, such water and other moisture as may remain therein, especially vapor, which hinders inspection.

The means shown for producing the desired suction in the pipes 261 comprise a blower 265 (Fig. 42) shown as driven by a drive-pulley 266. The suction inlet of the blower 265 is connected with a pipe 269 which opens into the upper end of a tank 270 into the upper end of which the lower open end of a pipe 271 communicating with the pipe 256, opens. The suction exerted by the blower 265 creates suction in the tank 270 and in turn in the piping arrangement terminating in the nozzle-equipped pipes 261. The water and other moisture, including any dirt or solids, drawn into the tank 270 gravitates to the bottom thereof from which it is drawn off through a pipe 272, valved at 273 and opening into a sump 274 which may communicate with a sewer. The tank 270 is shown as containing a baffle plate 275 in its lower portion and spaced from the lower drain outlet of the tank, this deflector serving to catch any dirt or other solids which may eventually accumulate in a period of time, thus preventing the plugging of the drain pipe and reducing the frequency of cleaning.

In the arrangement shown by-passes (Figs. 49 and 50) represented at 276 and each containing a check-valve represented generally at 277 and of any suitable construction, the tension of the spring of which is controlled by a stem-equipped hand-wheel 278, are connected at their opposite ends with the pipes leading to and from the liquid pumps 144 and 145, respectively, the purpose of these by-passes being to provide for the automatic relief of pressure from the high pressure sides of these pipe arrangements to the low pressure sides to avoid strain on the pumps, should material clogging of the spray nozzles occur.

Figure 29:
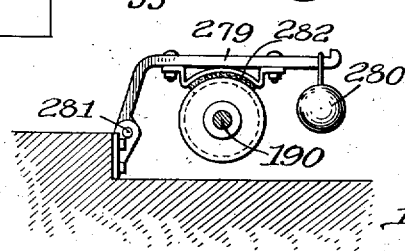

As hereinbefore explained, the shafts 190 are preferably associated with means for preventing overrun thereof in the rotation of the barrel-housings in either direction, the means shown for this purpose comprising levers 279 (Fig. 29), weighted as indicated at 280, and pivotally connected at 281 with a stationary structure and provided with braking portions 282 which conformingly bear against the sides of these shafts.

Provision is also made in the apparatus for draining from the floor upon which it is located such liquid as may collect thereon, the apparatus to this end comprising any suitable arrangement of sumps, (one of which is shown at 274 (Fig. 42) as above described) and passages leading therefrom, as for example to a sewer, as shown by the dotted representation in Fig. 42. Furthermore, the floor over which the barrel housings extend is preferably in the form of grates as shown more particularly in Figs. 5, 10 and 30 to permit of the draining therethrough of such liquid as may fall thereon.

Means are preferably provided for ensuring the automatic return of the lever 197 to neutral position in which the block 255 accurately registers with the recess 254 as shown in Fig. 33, in the movement of this lever, by the movement of the barrel housing, toward the position shown in this figure, these means in the arrangement shown (Figs. 55–59) comprising a tube 311 having a head 312 at one end pivoted to a stationary part of the apparatus, to swing about a vertical axis, as represented at 313. The opposite end of the tube 311 is rigidly connected with a spring housing device 314 which preferably rests upon the upper curved surface 315 of the shouldered portion 316 (Figs. 33 and 56).

The spring housing 314 is shown as formed of two open-ended tubes 317 at one of which tubes this housing is connected with the tube 311 these tubes being arranged in alinement and spaced apart with blocks 318 interposed therebetween and rigidly secured to the adjacent ends of the tubes 317, as by brazing or welding them thereto. The blocks 318 are spaced apart horizontally as shown in Figs. 55 and 59 to provide a space 319 into which the lever 197 extends, the adjacent ends of the tubes 317 being vertically slotted as represented at 320, with these slots extending in the same vertical plane as the space 319 to permit of the rocking of the lever 197 as hereinbefore described. Located within the tubes 317 and bearing at their opposite ends against stops 321 on these tubes and the ends of the blocks 318 are coil springs 322 which thus extend into the path of movement of the lever 197 in opposite directions, these springs in the neutral position of the lever 197 (Figs. 33 and 56) being in compression and provided of such strength that they will ensure the returning of the lever 197 to neutral position at the conclusion of the rotary movement of the barrel housing in either direction.

As the lever 197 in the particular arrangement shown, due to the provision of the threaded connection of this lever with the threaded bearing member 200 (Fig. 31), has a slight movement along the axis about which it rocks, the tube 311 is shown as pivoted at 313 to a stationary part of the apparatus.

While I have illustrated and described a particular apparatus embodying my invention, I do not wish to be understood as intending to limit it thereto as the same may be variously modified and altered without departing from the spirit of my invention.

What I claim as new, and desire to secure by Letters Patent, is:

1. In apparatus of the character described, the combination of a support for containers adapted to support a plurality of containers in parallel relationship, said support being rotatable about a fixed axis, passing through said plurality of containers, means for moving said support about said axis to cause said containers to simultaneously move into a position with their filler openings facing downwardly, means for directing liquid into said plurality of containers when in said last named position, and means for directing liquid upon the outer surfaces of said containers.

2. In apparatus of the character set forth, the combination of a support for containers and adapted to support a container on its side and revoluble through substantially a right angle to up-end the container, means for supplying liquid to the container when in the last-stated position, and means for preventing said first-named means from being operated unless said support is in said last-stated position.

3. In apparatus of the character described, the combination of a movable support for containers, said support having the form of a housing having closable end portions adapted to enclose and to support a plurality of containers therein in parallel relationship with one another, means for moving said support about an axis passing through said containers to move said end portions into a position to close said housing, and to cause the containers to simultaneously move into a position with their filler openings in a predetermined plane, and means operable when said support is in said last named position for directing liquid through said filler openings into the interior of said containers.

4. In apparatus of the character set forth, the combination of a support for containers adapted to support a container on its side and revoluble to up-end the container, said support being in the form of a housing enclosing the container and movable end-forming sections for the housing automatically movable to closed position when said support is rotated to the position last stated.

5. In apparatus of the character set forth, the combination of a stationary member, a support for containers having a side wall and adapted to support a container on its side and supported to be rotated to a position in which the container is up-ended, said stationary member and said side wall of said support together forming a housing for the container when in the last-stated position, and means for directing liquid into the interior of the container and against the exterior surface thereof when in said last-stated position.

6. In apparatus of the character set forth, the combination of a stationary member, a support for containers having a side wall and adapted to support a container on its side and supported to be rotated to cause the container to be up-ended, an edge of said side wall when said support is in a position for supporting a container on its side being spaced from the adjacent edge of said stationary member to present an opening, said stationary member and said support cooperating to form a closed housing when said support is in a position to up-end said container, and means for directing liquid into the container and against the exterior surface thereof when the container is in up-ended position.

7. In apparatus of the character set forth, the combination of a stationary member, a support for containers having a side wall and movable end-forming sections, said support being adapted to support a container on its side and being supported to be rotated to cause the container to be up-ended, said stationary member and said side wall of said support together forming a housing for the container when in the last-stated position and said end-forming sections being automatically movable to closed position when said support is rotated to a posiiton in which the container is up-ended, and means for directing liquid into the interior of the container and against the exterior surface thereof when in said last-stated position.

8. In apparatus of the character set forth for cleaning a container having a filler opening, the combination of a support for containers adapted to support a container on its side and revoluble to cause the container to be up-ended, said support being provided with a tubular member extending crosswise of said support and movable crosswise thereof and adapted to enter the filler opening of the container positioned on its side on said support, and means for supplying liquid to the interior of the container comprising a pipe through which the liquid is supplied, said pipe being movable toward and away from the container and so positioned as to register with said tubular member when said support is rotated into a position in which the container is up-ended.

9. In apparatus of the character set forth for cleaning a container having a filler opening, the combination of a support for containers adapted to support a container on its side and revoluble to cause the container to be up-ended, said support being provided with a tubular member extending crosswise of said support and movable crosswise thereof and adapted to enter the filler opening of the container positioned on its side on said support, and means for supplying liquid to the interior of the container comprising a pipe through which the liquid is supplied, said pipe being movable up and down and so positioned as to register with said tubular member when said support is rotated to a position in which the container is up-ended, the outer end of said tubular member being flared.

10. In an apparatus of the character set forth for cleaning a container having a filler opening in its end, a track support for a container lying on its side, means to mount said support for rotation on a horizontal axis, means to rotate said support to a position with the filling opening of the container lowermost, a pipe for supplying liquid to the interior of the container, means to mount the pipe for movement into and out of the filling opening while in the lowermost position and means to cause the said movements of the pipe.

11. In apparatus of the character set forth for cleaning containers having filler openings, the combination of a support for the containers adapted to support the containers when the containers are placed upon their sides thereupon, said support being revolvable about an axis passing through the containers to cause the containers to be up-ended, means for supplying liquid to the interior of said containers comprising pipes supported for movement into and out of the filler openings of the containers and through which liquid may be discharged into the containers, means operative to move said pipes out of their normal inoperative positions into said filler openings, when said containers are up-ended as stated, and thereafter automatically to remove said pipes from said filler openings, and means operating to supply liquid to the containers following the movement of said pipes out of their normal positions, said last named means being operable automatically when said pipes have returned to their normal positions to discontinue the supplying of liquid thereto.

12. In apparatus of the character set forth for cleaning containers having filler openings, the combination of means for supporting said containers, means for revolving said supporting means about an axis passing through the containers at right angles to the longitudinal axis thereof to move the containers collectively into up-ended positions, means for supplying liquid to the interior of the containers comprising pipes supported for movement into and out of the filler openings of the containers and through which the liquid is discharged into the containers, means operative to move said pipes out of normal position into said filler openings, when the containers are up-ended as above stated, and thereafter automatically remove said pipes from said filler openings, and means controlled by said third-named means for supplying liquid to said pipes following the movement of the latter out of normal position and operating automatically to discontinue the supplying of liquid thereto when said pipes have returned to normal position.

13. In an apparatus of the character set forth for cleaning a container having a filler opening in its end, a supporting means for containers mounted to rotate on a substantially horizontal axis, track members carried by said means to support a container on its side, means to rotate said means to a position with the filling opening of a carried container lowermost, a member carried by said supporting means to support the container in its last named position, a movably mounted liquid supply pipe, means to guide the pipe for movement into and out of the filling openings while in the lowermost position, means operative subsequent to the rotation of the supporting means to move the pipe into said filling opening, said last named means also automatically moving the pipe out of the filling opening.

14. In apparatus of the character set forth for cleaning a container having a filler opening, the combination of a horizontal track support for a container, means for moving said support into and out of such position that the filler opening of the container will be in registry with means for directing liquid to said container, means for directing liquid to said container when said support is in said position, and means for preventing the operation of said first-named means while said second-named means are operating.

15. In apparatus of the character set forth for cleaning a container having a filler opening, the combination of a horizontal track support for a container, means for moving said support into and out of such position that the filler opening of the container will be in registry with a movable liquid-supplying pipe, a liquid supplying pipe movable into and out of said filler opening, means for discharging liquid through said pipe into said container, means operative to move said pipe into said filler opening when said support is in said position, and means for preventing the operation of said first-named means while said pipe is in said filler opening.

16. In apparatus of the character set forth for cleaning a container having a filler opening, the combination of a track support for containers and adapted to support a container on its side and revoluble to cause the container to be upended, means for rotating said support into said last-named position, a pipe supported for movement into and out of the filler opening of the container when in up-ended position, means for discharging liquid through said pipe into the container, means operative to move said pipe into said filler opening when the container is in the last-stated position, and thereafter automatically remove said pipe from said filler opening, and means for preventing the operation of said first-named means while said pipe is in said filler opening.

17. In apparatus of the character set forth for cleaning a cylindrical container having a filler opening, the combination of a track support along and upon which the container may be rolled when the container is on its side, means for moving said support into and out of a position wherein the filler opening of the container may be in registration with a movable liquid supply spray pipe, a liquid spray pipe movable into and out of said filler opening, means for discharging liquid through said pipe and into said container, means operative to move said pipe into said filler opening, means preventing the operation of said pipe moving means when the support is in other than said last named position, and means for preventing the movement of said support when said pipe is in said filler opening.

18. In apparatus of the character set forth, the combination of a support for containers and adapted to support a container on its side and revoluble to up-end the container, means for rotating said support, means for supplying liquid to the container when in up-ended position, and a shiftable member normally locking said last-named means against actuation and extending into the path of movement of a part of said support whereby it is automatically movable by engagement therewith of said part of said support to a position for releasing said last-named means for operation upon the movement of said support into a position in which the container is up-ended.

19. In apparatus of the character set forth for cleaning a cylindrical container having a filler opening, the combination of a track support along and upon which said container may roll when resting upon its side thereon, means for moving said support into a position wherein the filler opening of the container thereupon may register with means for supplying liquid to the container, means for supplying liquid to the container, and a shiftable member, the position of which is controlled by said liquid supplying means and operating when said liquid supplying means are operating to prevent actuation of said support moving means.

20. In apparatus of the character set forth for cleaning a cylindrical container having a filler opening, the combination of a track support and housing for a cylindrical container wherein the container is disposed upon its side thereupon, said housing being accessible to receive containers when in its normal position, means for moving said support and housing about an axis extending through said container including a controlling element, means operable to close said housing upon the operation of said moving means to move the support and housing out of its normal position, and means operating automatically upon the movement of said support into a predetermined position about said axis to actuate said controlling element for discontinuing the operation of said support moving means.

21. In apparatus of the character set forth, the combination of a support for containers and adapted to support a container on its side and revoluble to up-end the container, means operative to rotate said support into and out of said last-named position and comprising a controlling element, and means cooperating with said controlling element and operating automatically in the movement of said support to container-up-ended position to actuate said controlling element to discontinue the operation of said first-named means when the container becomes up-ended and in the movement of said support in the opposite direction to actuate said controlling element to discontinue the operation of said first-named means when said support is in a position in which the container is on its side.

22. In apparatus of the character set forth, the combination of a support for a container, means for moving said support including a controlling element, means operating automatically upon the movement of said support into a predetermined position to actuate said controlling element for discontinuing the operation of said first-named means, means for supplying liquid to the container when said support is in said predetermined position, and means controlled by said third-named means for preventing said first-named means from operating during the operation of said third-named means.

23. In apparatus of the character set forth, the combination of a support for containers and adapted to support a container on its side and revoluble to up-end the container, means for rotating said support and comprising a controlling element movable into and out of neutral position, means operating automatically upon the movement of said support into container-up-ended position to actuate said controlling element for discontinuing the operation of said first-named means, means for supplying liquid to the container when said support is in container-up-ended position, and means on said support for rendering said third-named means operative when the support is in a container-up-ended position.

24. In apparatus of the character set forth, the combination of a support for containers and adapted to support a container on its side and revoluble to up-end the container, means for rotating said support and comprising a controlling element movable into and out of neutral position, means operating automatically upon the movement of said support into container-up-ended position to actuate said controlling element for discontinuing the operation of said first-named means, means for supplying liquid to the container when said support is in container-up-ended position, and means controlled by said third-named means and conditionable when said controlling element is in neutral position and operating to prevent said first-named means from being operated when said third-named means are operating.

25. In apparatus of the character set forth, the combination of a support for containers and adapted to support a container on its side and revoluble to up-end the container, means for rotating said support and comprising a controlling element movable into and out of neutral position, means operating automatically upon the movement of said support into container-up-ended position to actuate said controlling element for discontinuing the operation of said first-named means, means for supplying liquid to the container when said support is in container-up-ended position, and means on said support for rendering said third-named means operative when the support is in a container-up-ended position, and means for ensuring the accurate positioning of said controlling element in neutral position when said support is in container-up-ended position.

26. In apparatus of the character set forth, the combination of a support for containers and adapted to support a container on its side and revoluble to up-end the container, means for rotating said support and comprising a controlling element movable into and out of neutral position, means operating automatically upon the movement of said support into container up-ended position to actuate said controlling element for discontinuing the operation of said first-named means, means for supplying liquid to the container when said support is in container-up-ended position, means to prevent said third-named means from operating when said controlling element is out of neutral position, and means for ensuring the accurate positioning of said controlling element in neutral position when said support is in container-up-ended position comprising spring means arranged to exert pressure from opposite directions against said controlling element.

27. In apparatus of the character set forth for cleaning a cylindrical container having a filler opening in its end, a support for said container mounted to rotate on a substantially horizontal axis, said support having a portion which, when said support is in one position, forms a track along and upon which the container may be rolled when the container is on its side and a portion to support the container when said support is rotated to a position in which that end of the container which contains the filler opening is lowermost, means for rotating said support into a container-up-ending position, a spraying means, means for moving said spraying means into and out of said container through said filler opening and operable only when said support is in a container-up-ending position, and means for automatically discharging a spraying fluid through such spraying means while the latter is positioned within said container.

28. In apparatus of the character set forth for cleaning containers having a filler opening, the combination of a support for said containers adapted to support said containers on its side, a means for rotating said support to cause the containers to be up-ended, said support being provided with a side wall, a stationary wall, said stationary wall and side wall together forming a housing for the containers when said support is rotated to up-end the containers, a plurality of liquid-supply pipes movable into and out of the filler openings of the containers when said containers are in an up-ended position, means for discharging liquid through said pipes and into said containers, and means for directing a fluid against the exterior of said containers.

29. In apparatus of the character set forth for cleaning a container having a filler opening in its end, a support for a container mounted to rotate on a substantially horizontal axis, said support having a portion which, when said support is in one position, forms a support for a container rolled on its side onto said support, and a portion to support the container when said support is rotated to a position in which that end of the container which contains the filler opening is lowermost, a means for rotating said support to cause the containers to be up-ended, said support being provided with a side wall, a stationary wall, said stationary wall and side wall together forming a housing for the container when said support is rotated to up-end the container, spraying means, means for moving said spraying means into and out of said container through said filler opening and operable only when said filler opening is in registry with said spraying means, and means for automatically discharging a spraying fluid through said spraying means while the latter is positioned within said container.

30. In an apparatus of the character set forth for cleaning containers having a filler opening in their ends, the combination of a movable support for a plurality of containers, tubular guide means fixed to said support and adapted to be partially received in said container filler openings, a plurality of movable interior spraying means, means for moving the support into such position that the aligned guide means and filler openings of said containers will be in registry with said plurality of movable spraying means, a plurality of movable exterior spraying means including nozzles fixed to said support so as to move therewith and directed upon the exterior walls of said containers, means for moving said interior spraying means into and out of each container through said guide means and the filler opening and operable only when said support is in said position with the filler openings in registry with said plurality of interior spraying means, and means for automatically discharging a spraying fluid through all of said plurality of spraying means when the interior spraying means are positioned within the containers.

31. Apparatus of the character described for cleaning cylindrical containers having filler openings, comprising a rigid bodily movable support for supporting a plurality of said containers in parallel relationship, tubular guide members fixed to said support and adapted to be partially received within the filler openings of said containers, a plurality of spray nozzles mounted for movement relative to said movable support, means for bodily revolving said support about an axis passing through said containers so as to cause all of said containers upon said support to move and to cause all of said guide members to register with said spray nozzles, means for moving said nozzles through said guide members and into the interior of said containers, and means for supplying said spray nozzles with a liquid.

32. Apparatus of the character described for cleaning cylindrical containers having filler openings, comprising, a movable support for supporting a plurality of said containers in parallel relationship, a normally open housing having closable end portions surrounding said support, tubular guide members fixed to said support and adapted to be partially received within the filler openings in said containers, a plurality of spray nozzles located beneath said support and mounted for movement upwardly into a plane above the container supporting surface of said support, means for moving said support to move said containers collectively and to cause said guide members to register with said spray nozzles and simultaneously move said closable end portions to close said housing, means operable upon the registration of said tubular guide members for elevating said nozzles through said guide members and into said containers, and means for supplying said nozzles with a liquid under pressure upon the elevation of the nozzles into the containers.

33. A container washing machine comprising, a movable support for containers, said support including a housing having closable end portions adapted to enclose containers placed upon the container supporting surface thereof in parallel relationship with one another, spray nozzles fixed relatively to said support within said housing and directed upon the exterior surfaces of said containers, a plurality of movable spray nozzles, means for moving said support bodily to move said end portions into a position to close said housing and to cause the containers simultaneously to move into a position with their filler openings in registration with said movable nozzles, and means operable when said support is moved into said last-named position to project said movable nozzles into said containers through their filler openings and simultaneously to admit fluid to all of said spray nozzles.

34. A container washing machine comprising, a rigid movable support for containers, spray nozzles fixed to said support so as to move therewith and directed upon the exterior surfaces of said containers, a plurality of movable spray nozzles, means for moving said support bodily to cause the containers upon the support simultaneously to move into a position with their filler openings in registration with said movable nozzles, and means operable when said support is bodily moved into said last-named position to project said movable nozzles into said containers through their filler openings and simultaneously to admit fluid to all of said spray nozzles.

35. In apparatus of the character set forth for cleaning a container having a filler opening, the combination of a horizontal track support for a container, a tubular guide member fixed to said support and adapted to be partially received within said container filler opening, means for moving said support into and out of such position that the tubular guide member will be in registry with means for directing liquid to said container, means for directing liquid to said container when said support is in said position through guide member, and means for preventing the operation of said first-named means while said second-named means are operating.

36. In apparatus of the character set forth for cleaning a container having a filler opening, the combination of a horizontal support for a container, a tubular guide member fixed to said support and adapted to be partially received within said container filler opening, means for revolving said support about an axis passing through said container, into and out of such position that said guide member will be in registry with a movable liquid-supplying pipe, a liquid-supplying pipe for movement into and out of said tubular guide member, means for discharging liquid through said pipe into said container, means operative to move said pipe through said guide member when said support is in said position, and means for preventing the operation of said first-named means while said pipe is in said tubular guide member.

CARL J. SCHROEDER.

CERTIFICATE OF CORRECTION.

Patent No. 2,058,728.   October 27, 1936.

CARL J. SCHROEDER.

It is hereby certified that error appears in the printed specification of the above numbered patent requiring correction as follows: Page 5, second column, line 12, after "of" insert the words one of; and that the said Letters Patent should be read with this correction therein that the same may conform to the record of the case in the Patent Office.

Signed and sealed this 5th day of January, A. D. 1937.

Henry Van Arsdale
Acting Commissioner of Patents.

(Seal)

relationship with one another, spray nozzles fixed relatively to said support within said housing and directed upon the exterior surfaces of said containers, a plurality of movable spray nozzles, means for moving said support bodily to move said end portions into a position to close said housing and to cause the containers simultaneously to move into a position with their filler openings in registration with said movable nozzles, and means operable when said support is moved into said last-named position to project said movable nozzles into said containers through their filler openings and simultaneously to admit fluid to all of said spray nozzles.

34. A container washing machine comprising, a rigid movable support for containers, spray nozzles fixed to said support so as to move therewith and directed upon the exterior surfaces of said containers, a plurality of movable spray nozzles, means for moving said support bodily to cause the containers upon the support simultaneously to move into a position with their filler openings in registration with said movable nozzles, and means operable when said support is bodily moved into said last-named position to project said movable nozzles into said containers through their filler openings and simultaneously to admit fluid to all of said spray nozzles.

35. In apparatus of the character set forth for cleaning a container having a filler opening, the combination of a horizontal track support for a container, a tubular guide member fixed to said support and adapted to be partially received within said container filler opening, means for moving said support into and out of such position that the tubular guide member will be in registry with means for directing liquid to said container, means for directing liquid to said container when said support is in said position through guide member, and means for preventing the operation of said first-named means while said second-named means are operating.

36. In apparatus of the character set forth for cleaning a container having a filler opening, the combination of a horizontal support for a container, a tubular guide member fixed to said support and adapted to be partially received within said container filler opening, means for revolving said support about an axis passing through said container, into and out of such position that said guide member will be in registry with a movable liquid-supplying pipe, a liquid-supplying pipe for movement into and out of said tubular guide member, means for discharging liquid through said pipe into said container, means operative to move said pipe through said guide member when said support is in said position, and means for preventing the operation of said first-named means while said pipe is in said tubular guide member.

CARL J. SCHROEDER.

---

CERTIFICATE OF CORRECTION.

Patent No. 2,058,728.     October 27, 1936.

CARL J. SCHROEDER.

It is hereby certified that error appears in the printed specification of the above numbered patent requiring correction as follows: Page 5, second column, line 12, after "of" insert the words one of; and that the said Letters Patent should be read with this correction therein that the same may conform to the record of the case in the Patent Office.

Signed and sealed this 5th day of January, A. D. 1937.

Henry Van Arsdale
Acting Commissioner of Patents.

(Seal)

CERTIFICATE OF CORRECTION.

Patent No. 2,058,728.  October 27, 1936.

CARL J. SCHROEDER.

It is hereby certified that error appears in the printed specification of the above numbered patent requiring correction as follows: Page 5, second column, line 12, after "of" insert the words one of; and that the said Letters Patent should be read with this correction therein that the same may conform to the record of the case in the Patent Office.

Signed and sealed this 5th day of January, A. D. 1937.

Henry Van Arsdale

(Seal)  Acting Commissioner of Patents.